(12) United States Patent
Skog et al.

(10) Patent No.: US 12,493,029 B2
(45) Date of Patent: Dec. 9, 2025

(54) COMPOSITIONS, METHODS, AND KITS FOR THE ISOLATION OF EXTRACELLULAR VESICLES

(71) Applicant: Exosome Diagnostics, Inc., Waltham, MA (US)

(72) Inventors: Johan Karl Olov Skog, Lincoln, MA (US); Olubode A. Ogunlusi, Framingham, MA (US); Robert Raymond Kitchen, Somerville, MA (US); Douglas Roberts, Waltham, MA (US); Wei Yu, Belmont, MA (US)

(73) Assignee: Exosome Diagnostics, Inc., Waltham, MA (US)

( * ) Notice: Subject to any disclaimer, the term of this patent is extended or adjusted under 35 U.S.C. 154(b) by 937 days.

(21) Appl. No.: 17/761,398

(22) PCT Filed: Sep. 18, 2020

(86) PCT No.: PCT/US2020/051520
§ 371 (c)(1),
(2) Date: Mar. 17, 2022

(87) PCT Pub. No.: WO2021/055770
PCT Pub. Date: Mar. 25, 2021

(65) Prior Publication Data
US 2022/0412971 A1 Dec. 29, 2022

Related U.S. Application Data

(60) Provisional application No. 62/902,058, filed on Sep. 18, 2019.

(51) Int. Cl.
*G01N 33/543* (2006.01)
*C12N 15/10* (2006.01)

(52) U.S. Cl.
CPC ... *G01N 33/54333* (2013.01); *C12N 15/1013* (2013.01)

(58) Field of Classification Search
None
See application file for complete search history.

(56) References Cited

U.S. PATENT DOCUMENTS

| 2007/0254351 A1 | 11/2007 | Abrignani et al. |
| 2013/0203061 A1* | 8/2013 | Kuslich .............. G01N 33/5076 435/6.12 |

(Continued)

FOREIGN PATENT DOCUMENTS

| WO | WO-2014107571 A1 | 7/2014 |
| WO | WO-2016007755 A1 | 1/2016 |

(Continued)

OTHER PUBLICATIONS

Chen et al., Advances in exosomes technology, Clinica Chimica Acta, 2019, pp. 14-19, vol. 493.

(Continued)

*Primary Examiner* — Rebecca M Giere
(74) *Attorney, Agent, or Firm* — McNeill PLLC

(57) ABSTRACT

The present disclosure relates to compositions, methods and kits for the isolation of extracellular vesicles. The compositions, methods and kits can comprise a high-density liquid reagent that facilitates the sequestration of extracellular vesicles bound to magnetic beads.

17 Claims, 14 Drawing Sheets

(56) References Cited

U.S. PATENT DOCUMENTS

2016/0186262 A1* 6/2016 Johnson ............... C12Q 1/6883
 506/2
2019/0250147 A1* 8/2019 Vallabhajosyula ..........................
 G01N 33/5076

FOREIGN PATENT DOCUMENTS

WO    WO-2017197399 A1    11/2017
WO    WO-2021055770 A2    3/2021

OTHER PUBLICATIONS

Koliha et al., A novel multiplex bead-based platform highlights the diversity of extracellular vesicles, Journal of Extracellular Vesicles, 2016, 15 pages. http://dx.doi.org/10.3402/jev.v5.29975\.

Li et al., Progress in Exosome Isolation Techniques, Theranostics, 2017, pp. 789-804, vol. 7, No. 3. doi:10.7150/thno.18133.

Zocco & Zarovni, Chapter 22: Extraction and Analysis of Extracellular Vesicle-Associated miRNAs Following Antibody-Based Extracellular Vesicle Capture from Plasma Samples, Plant Genotyping, Methods in Molecular Biology, Jan. 2017, pp. 269-285.

\* cited by examiner

COMPOSITIONS, METHODS, AND KITS FOR THE ISOLATION OF EXTRACELLULAR VESICLES

RELATED APPLICATIONS

This application is a U.S. National Stage Phase Application, filed under 35 U.S.C § 371 of International Application No. PCT/US2020/051520, filed on Sep. 18, 2020, which claims the priority to, and the benefit of, U.S. Provisional Application No. 62/902,058, filed Sep. 18, 2019. The contents of each of the aforementioned patent applications are incorporated herein by reference in their entireties.

BACKGROUND

In molecular biology, molecules, such as nucleic acids, can be isolated from human sample material, such as plasma and other body fluids ('biofluids'), and further analyzed with a wide range of methodologies. Biofluids from humans (and other species) contain cells and cell-free sources of molecules shed by all cells of the body. Cell-free sources include extracellular vesicles ('EVs') and the molecules carried on or within ('EV cargo'; e.g. RNA, DNA, lipids, small metabolites, and proteins) and cell-free DNA (cfDNA), which is likely to be derived from apoptotic and necrotic tissue. EVs are membranous vesicles between 30 and 5,000 nm in diameter, the majority being 30-300 nm in diameter. EVs are also commonly referred to as exosomes and microvesicles. Exosomes are a class of EVs that are actively shed into the body by all living cells. They contain nucleic acids that derive directly from their source cells and have been isolated from multiple biofluids. As such, exosomes are a rich resource for liquid-biopsy based molecular diagnostics investigating the detection of genetic abnormalities associated with various diseases, including oncology. Thus, there is a need in the art for improved compositions, methods and kits directed to the isolation of exosomes and microvesicles from biological samples for the extraction of high quality nucleic acids and proteins for accurate diagnosis of medical conditions and diseases.

Existing methods of isolating exosomes and microvesicles rely on the use of ultracentrifugation, e.g., spinning at more than 10,000×g for 1-3 hrs. In particular, existing methods rely on differential centrifugation with a final ultracentrifugation step, density gradient centrifugation and density cushion centrifugation. Other existing isolation methods also utilize size exclusion chromatography, immunoaffinity chromatography and precipitation methods. These existing methods demonstrate several disadvantages such as being slow, tedious, subject to variability between batches, not suited for scalability and not automatable.

In contrast, the methods of the present disclosure enable high-throughput isolation of microvesicles from more than one (e.g. tens of, hundreds of, even thousands of) biological samples concurrently in a time and cost-efficient manner. In particular, the methods of the present invention do not require a centrifugation step, nor do they require a washing step. As such, the methods presented herein are amenable to automation on a large scale.

SUMMARY

The present disclosure provides a method of isolating at least one microvesicle comprising at least one surface marker from at least one biological sample, the method comprising: a) incubating the at least one biological sample with at least one particle that binds to the at least one surface marker under conditions sufficient to form at least one magnetic particle-microvesicle complex, wherein the at least one particle is a magnetic particle; b) contacting the at least one biological sample with at least one high-density matrix; c) subjecting the at least one biological sample and the at least one high-density matrix to a magnetic field such that the at least one magnetic particle-microvesicle complex is translocated through the high-density matrix, thereby isolating at least one microvesicle.

The present disclosure also provides a method of isolating at least one microvesicle comprising at least one surface marker from at least one biological sample, the method comprising: a) incubating the at least one biological sample with at least one particle that binds to the at least one surface marker under conditions sufficient to form at least one particle-microvesicle complex; b) contacting the at least one biological sample with at least one high-density matrix; c) subjecting the at least one biological sample and the at least one high-density matrix to at least one force such that the at least one particle-microvesicle complex is translocated through the high-density matrix, thereby isolating at least one microvesicle.

Steps (b) and (c) of the preceding methods can be performed in at least one well of a microwell plate.

In some aspects of the preceding methods, prior to step (a), the at least one particle that binds to the at least one surface maker can be reconstituted in at least one diluent.

The preceding methods can further comprise: d) removing the biological sample and the high-density matrix from the at least one particle-microvesicle complex.

The preceding methods can further comprise: d) removing at least 80% of the biological sample and at least 80% of the high-density matrix from the at least one particle-microvesicle complex.

The preceding methods can further comprise: d) removing at least 90% of the biological sample and at least 90% of the high-density matrix from the at least one particle-microvesicle complex.

The preceding methods can further comprise: d) removing at least 95% of the biological sample and at least 95% of the high-density matrix from the at least one particle-microvesicle complex.

The preceding methods can further comprise: d) removing at least 99% of the biological sample and at least 99% of the high-density matrix from the at least one particle-microvesicle complex.

A force can be a magnetic force, a gravitational force, a centrifugal force, a pressure or any combination thereof.

A high-density matrix can have a density that is equal to or greater than 1.22 g/ml. A high-density matrix can comprise Optiprep, sucrose, Ficoll, Histopaque, Percoll, or any combination thereof. A high-density matrix can comprise at least 50 µl of Optiprep, sucrose, Ficoll, Histopaque, Percoll, or any combination thereof.

At least one surface marker can be selected from the markers listed in Table 1 or Table 2.

A particle can comprise at least one antibody or at least one antibody fragment that binds to the at least one surface marker.

An antibody or an antibody fragment can be coupled to the at least one particle by perfectly base-paired sense and anti-sense oligonucleotides, a partially double-stranded oligonucleotide, a double-stranded oligonucleotide, a photocleavable linker moiety, a disulfide bond, at least one peptide or any combination thereof.

A particle can comprise at least one affinity molecule that binds to the at least one surface marker.

An affinity molecule can comprise at least one antibody fragment, at least one aptamer, at least one aptamer analog, at least one lectin, at least one molecularly imprinted polymer or any combination thereof.

A particle can comprise a ferromagnetic bead.

A microwell plate can be a 6-well plate, a 12-well plate, a 48-well plate, a 96-well plate, a 384-well plate or a 1536-well plate.

In some aspects, removing the biological sample and the high-density matrix from the at least one particle-microvesicle complex can comprise aspiration.

In some aspects of the preceding methods, at least 80%, or at least 90%, or at least 95%, or at least 99% of the microvesicles in the biological sample that comprise the at least one surface marker are isolated.

A biological sample can comprise blood, serum, plasma, urine cerebrospinal fluid or any combination thereof.

The preceding methods can further comprise extracting at least one nucleic acid from the isolated at least one microvesicle. A nucleic acid can comprise RNA, DNA or a combination of RNA and DNA.

The preceding methods can further comprise extracting at least one protein from the isolated at least one microvesicle.

The preceding methods can further comprise extracting at least one carbohydrate molecule from the isolated at least one microvesicle.

The preceding methods can further comprise extracting at least one lipid from the isolated at least one microvesicle.

The present disclosure provides a kit for isolating at least one microvesicle comprising at least one surface marker from at least one biological sample, the kit comprising: a) at least one particle that binds to the at least one surface marker; and b) at least one high-density matrix. The preceding kit can further comprise at least one microwell plate. The preceding kit can further comprise at least one diluent. In some aspects of the preceding kit, the particle and be a magnetic particle.

Any of the above aspects can be combined with any other aspect.

Unless otherwise defined, all technical and scientific terms used herein have the same meaning as commonly understood by one of ordinary skill in the art to which this disclosure belongs. In the Specification, the singular forms also include the plural unless the context clearly dictates otherwise; as examples, the terms "a," "an," and "the" are understood to be singular or plural and the term "or" is understood to be inclusive. By way of example, "an element" means one or more element. Throughout the specification the word "comprising," or variations such as "comprises" or "comprising," will be understood to imply the inclusion of a stated element, integer or step, or group of elements, integers or steps, but not the exclusion of any other element, integer or step, or group of elements, integers or steps. About can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Although methods and materials similar or equivalent to those described herein can be used in the practice or testing of the present disclosure, suitable methods and materials are described below. All publications, patent applications, patents, and other references mentioned herein are incorporated by reference in their entirety. The references cited herein are not admitted to be prior art to the claimed invention. In the case of conflict, the present Specification, including definitions, will control. In addition, the materials, methods, and examples are illustrative only and are not intended to be limiting. Other features and advantages of the disclosure will be apparent from the following detailed description and claim.

BRIEF DESCRIPTION OF THE DRAWINGS

The above and further features will be more clearly appreciated from the following detailed description when taken in conjunction with the accompanying drawings.

DETAILED DESCRIPTION

Figure 1:
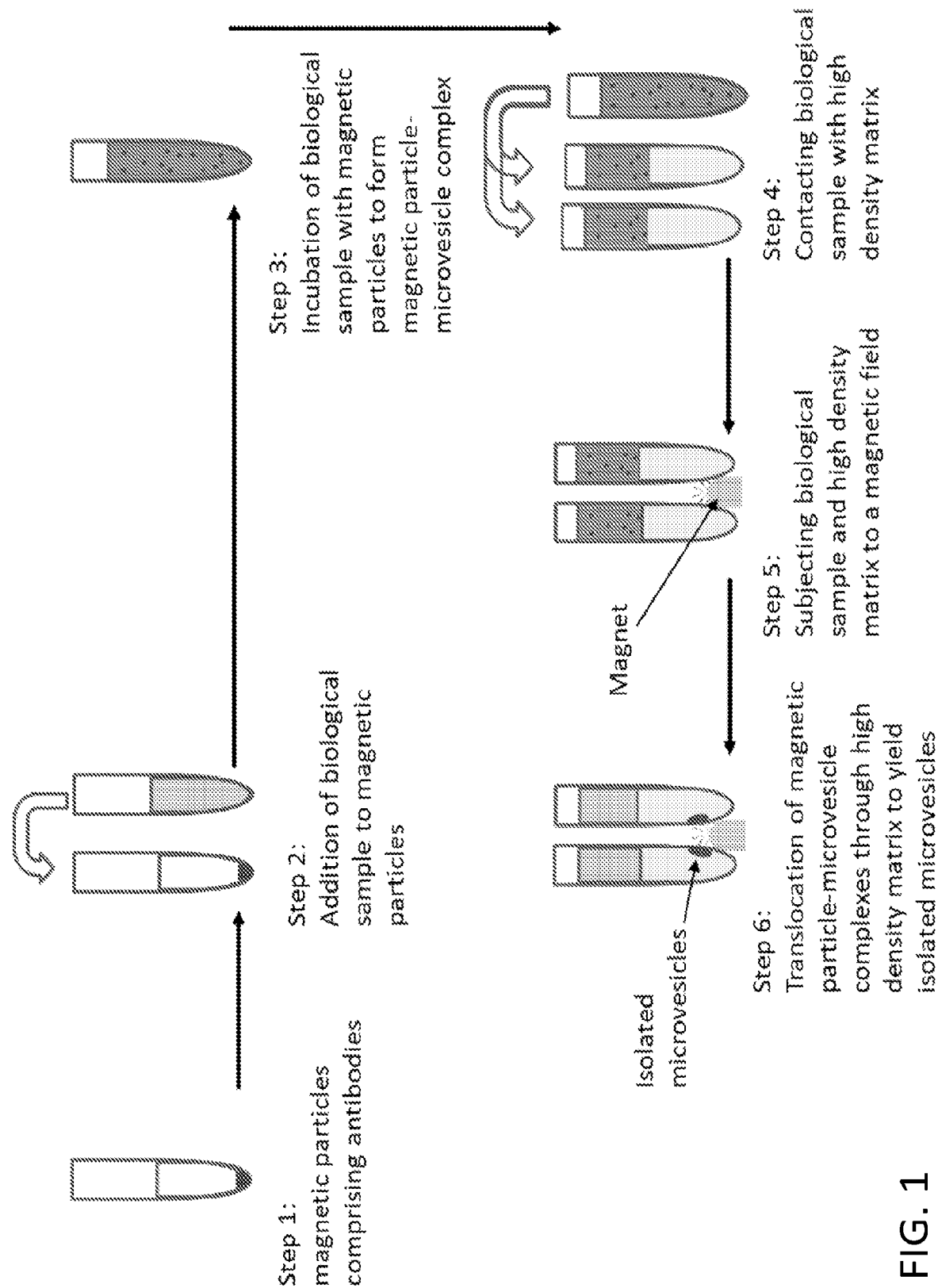
FIG. 1 is an exemplary schematic overview of the microvesicle isolation methods of the present disclosure.

The present disclosure provides compositions, methods and kits for the isolation of extracellular vesicles, including microvesicles and exosomes. Microvesicles have been previously shown to be valuable diagnostic and prognostic tools. All membrane vesicles shed by cells <0.8 μm in diameter are referred to herein collectively as microvesicles. This may include exosomes, exosome-like particles, prostasomes, dexosomes, texosomes, ectosomes, oncosomes, apoptotic bodies, retrovirus-like particles, and human endogenous retrovirus (HERV) particles or any combination thereof.

The present disclosure provides a method of isolating at least one microvesicle comprising at least one surface marker from at least one biological sample, the method comprising: a) incubating the at least one biological sample with at least one particle that binds to the at least one surface marker under conditions sufficient to form at least one particle-microvesicle complex; b) contacting the at least one biological sample with at least one high-density matrix; c) subjecting the at least one biological sample and the at least one high-density matrix to at least one force such that the at least one particle-microvesicle complex is translocated through the high-density matrix, thereby isolating at least one microvesicle.

In some aspects of the methods of the present disclosure, the at least one particle can comprise at least one magnetic particle. In some aspects, the at least one force can be a magnetic force that is provided by a magnetic field. In some aspects, the at least one particle can be a magnetic particle and the at least one force can be a magnetic force that is provided by a magnetic field. Thus, the present disclosure provides a method of isolating at least one microvesicle comprising at least one surface marker from at least one biological sample, the method comprising: a) incubating the at least one biological sample with at least one magnetic particle that binds to the at least one surface marker under conditions sufficient to form at least one magnetic particle-microvesicle complex; b) contacting the at least one biological sample with at least one high-density matrix; c) subjecting the at least one biological sample and the at least one high-density matrix to a magnetic field such that the at least one magnetic particle-microvesicle complex is translocated through the high-density matrix, thereby isolating at least one microvesicle.

In some aspects of the methods of the present disclosure, the at least one particle can be a non-magnetic particle. In some aspects, the at least one force can be centrifugal force, gravity, pressure or any combination thereof. In a non-limiting example, centrifugal force can be provided by centrifuging the at least one biological sample and the at least one high-density matrix.

Thus the present disclosure provides a method of isolating at least one microvesicle comprising at least one surface marker from at least one biological sample, the method comprising: a) incubating the at least one biological sample with at least one particle that binds to the at least one surface marker under conditions sufficient to form at least one particle-microvesicle complex; b) contacting the at least one biological sample with at least one high-density matrix; c) subjecting the at least one biological sample and the at least one high-density matrix to at least one force such that the at least one particle-microvesicle complex is translocated through the high-density matrix, thereby isolating at least one microvesicle, wherein the force is gravitational force, centrifugal force, pressure or any combination thereof.

FIG. 1 is an exemplary schematic overview of the preceding methods. In step 1, magnetic particles comprising antibodies that bind to a particular surface marker are aliquoted into a tube. In step 2, the biological sample is added to the magnetic particles. In step 3, the magnetic particles and biological sample are incubated together to allow for the formation of at least one magnetic particle-microvesicle complex. In step 4, the biological sample is contacted with a high-density matrix. In step 5, the biological sample and the high-density matrix are subjected to a magnetic field such that the at least one magnetic particle-microvesicle complex is translocated through the high-density matrix, thereby isolating at least one microvesicle.

The present disclosure also provides a kit for isolating at least one microvesicle comprising at least one surface marker from at least one biological sample, the kit comprising: a) at least one particle that binds to the at least one surface marker; and b) at least one high-density matrix. A kit of the present disclosure can further comprise instructions for isolating at least isolating at least one microvesicle comprising at least one surface marker from at least one biological sample. The instructions can be written instructions.

In some aspects of the methods and kits of the present disclosure, a high-density matrix has a density that is equal to or greater than 1.22 g/ml. In some aspects of the methods and kits of the present disclosure, a high-density matrix has a density that is equal to or greater than 1.0 g/ml, or 1.1 g/ml, or 1.2 g/ml, or 1.3 g/ml, or 1.4 g/ml, or 1.5 g/ml, or 1.6 g/ml, or 1.7 g/ml, or 1.8 g/ml, or 1.9 g/ml, or 2.0 g/ml, or 2.1 g/ml, or 2.2 g/ml, or 2.3 g/ml, or 2.4 g/ml, or 2.5 g/ml, or 2.6 g/ml, 2.7 g/ml, or 2.8 g/ml, or 2.9 g/ml, or 3.0 g/ml, or 3.1 g/ml, or 3.2 g/ml, or 3.3 g/ml, or 3.4 g/ml, or 3.5 g/ml, or 3.6 g/ml, or 3.7 g/ml, or 3.8 g/ml, or 3.9 g/ml or 4.0 g/ml.

In some aspects of the methods and kits of the present disclosure, a high-density matrix can comprise Optiprep (60% iodixanol w/v), sucrose, Ficoll, Histopaque, Percoll, trehalose, glycerol or any combination thereof. Thus, the present disclosure provides a method of isolating at least one microvesicle comprising at least one surface marker from at least one biological sample, the method comprising: a) incubating the at least one biological sample with at least one magnetic particle that binds to the at least one surface marker under conditions sufficient to form at least one magnetic particle-microvesicle complex; b) contacting the at least one biological sample with Optiprep; c) subjecting the at least one biological sample and the Optiprep to a magnetic field such that the at least one magnetic particle-microvesicle complex is translocated through Optiprep, thereby isolating at least one microvesicle.

As used herein, the term "Optiprep" is used to refer to a solution that is about 60% iodixanol w/v.

In some aspects of the methods and kits of the present disclosure, a high-density matrix can comprise about 10% iodixanol (w/v), about 15% iodixanol (w/v), about 20% iodixanol (w/v), about 25% iodixanol (w/v), about 30% iodixanol (w/v), about 35% iodixanol (w/v), about 40% iodixanol (w/v), about 45% iodixanol (w/v), about 50% iodixanol (w/v), about 55% iodixanol (w/v), about 60% iodixanol (w/v), about 65% iodixanol (w/v), about 70% iodixanol (w/v), about 75% iodixanol (w/v), about 80% iodixanol (w/v), about 85% iodixanol (w/v), about 90% iodixanol (w/v), about 95% iodixanol (w/v) or about 100% iodixanol (w/v).

In some aspects of the methods and kits of the present disclosure, a high-density matrix can comprise about 10% Optiprep, about 15% Optiprep, about 20% Optiprep, about 25% Optiprep, about 30% Optiprep, about 35% Optiprep, about 40% Optiprep, about 45% Optiprep, about 50% Optiprep, about 55% Optiprep, about 60% Optiprep, about 65% Optiprep, about 70% Optiprep, about 75% Optiprep, about 80% Optiprep, about 85% Optiprep, about 90% Optiprep, about 95% Optiprep or about 100% Optiprep.

In some aspects of the methods and kits of the present disclosure, a high-density matrix can comprise about 10% sucrose (w/v), about 15% sucrose (w/v), about 20% sucrose (w/v), about 25% sucrose (w/v), about 30% sucrose (w/v), about 35% sucrose (w/v), about 40% sucrose (w/v), about 45% sucrose (w/v), about 50% sucrose (w/v), about 55% sucrose (w/v), about 60% sucrose (w/v), about 65% sucrose (w/v), about 70% sucrose (w/v), about 75% sucrose (w/v), about 80% sucrose (w/v), about 85% sucrose (w/v), about 90% sucrose (w/v), about 95% sucrose (w/v) or about 100% sucrose (w/v).

In some aspects of the methods and kits of the present disclosure, a high-density matrix can comprise about 10% Ficoll (w/v), about 15% Ficoll (w/v), about 20% Ficoll (w/v), about 25% Ficoll (w/v), about 30% Ficoll (w/v), about 35% Ficoll (w/v), about 40% Ficoll (w/v), about 45% Ficoll (w/v), about 50% Ficoll (w/v), about 55% Ficoll (w/v), about 60% Ficoll (w/v), about 65% Ficoll (w/v), about 70% Ficoll (w/v), about 75% Ficoll (w/v), about 80% Ficoll (w/v), about 85% Ficoll (w/v), about 90% Ficoll (w/v), about 95% Ficoll (w/v) or about 100% Ficoll (w/v).

In some aspects of the methods and kits of the present disclosure, a high-density matrix can comprise about 10% Histopaque (w/v), about 15% Histopaque (w/v), about 20% Histopaque (w/v), about 25% Histopaque (w/v), about 30% Histopaque (w/v), about 35% Histopaque (w/v), about 40% Histopaque (w/v), about 45% Histopaque (w/v), about 50% Histopaque (w/v), about 55% Histopaque (w/v), about 60% Histopaque (w/v), about 65% Histopaque (w/v), about 70% Histopaque (w/v), about 75% Histopaque (w/v), about 80% Histopaque (w/v), about 85% Histopaque (w/v), about 90% Histopaque (w/v), about 95% Histopaque (w/v) or about 100% Histopaque (w/v).

In some aspects of the methods and kits of the present disclosure, a high-density matrix can comprise about 10% Percoll (w/v), about 15% Percoll (w/v), about 20% Percoll (w/v), about 25% Percoll (w/v), about 30% Percoll (w/v), about 35% Percoll (w/v), about 40% Percoll (w/v), about 45% Percoll (w/v), about 50% Percoll (w/v), about 55% Percoll (w/v), about 60% Percoll (w/v), about 65% Percoll (w/v), about 70% Percoll (w/v), about 75% Percoll (w/v), about 80% Percoll (w/v), about 85% Percoll (w/v), about 90% Percoll (w/v), about 95% Percoll (w/v) or about 100% Percoll (w/v).

In some aspects of the methods and kits of the present disclosure, a high-density matrix can comprise about 10% trehalose (w/v), about 15% trehalose (w/v), about 20% trehalose (w/v), about 25% trehalose (w/v), about 30% trehalose (w/v), about 35% trehalose (w/v), about 40% trehalose (w/v), about 45% trehalose (w/v), about 50% trehalose (w/v), about 55% trehalose (w/v), about 60% trehalose (w/v), about 65% trehalose (w/v), about 70% trehalose (w/v), about 75% trehalose (w/v), about 80% trehalose (w/v), about 85% trehalose (w/v), about 90% trehalose (w/v), about 95% trehalose (w/v) or about 100% trehalose (w/v).

In some aspects of the methods and kits of the present disclosure, a high-density matrix can comprise about 10% glycerol (w/v), about 15% glycerol (w/v), about 20% glycerol (w/v), about 25% glycerol (w/v), about 30% glycerol (w/v), about 35% glycerol (w/v), about 40% glycerol (w/v), about 45% glycerol (w/v), about 50% glycerol (w/v), about 55% glycerol (w/v), about 60% glycerol (w/v), about 65% glycerol (w/v), about 70% glycerol (w/v), about 75% glycerol (w/v), about 80% glycerol (w/v), about 85% glycerol (w/v), about 90% glycerol (w/v), about 95% glycerol (w/v) or about 100% glycerol (w/v).

In some aspects of the methods and kits of the present disclosure, a high-density matrix can comprise at least 50 µl of Optiprep, sucrose, Ficoll, Histopaque, Percoll, trehalose, glycerol, or any combination thereof. In some aspects of the methods of the present disclosure, a high-density matrix can comprise at least 10 µl, or at least 15 µl, at least 20 µl, or at least 25 µl, at least 30 µl, or at least 35 µl, at least 40 µl, or at least 45 µl, at least 50 µl, or at least 55 µl, at least 60 µl, or at least 65 µl, at least 70 µl, or at least 75 µl, at least 80 µl, or at least 85 µl, at least 90 µl, or at least 95 µl, at least 100 µl, or at least 115 µl, at least 120 µl, or at least 125 µl, at least 130 µl, or at least 135 µl, at least 140 µl, or at least 145 µl, at least 150 µl, or at least 155 µl, at least 160 µl, or at least 165 µl, at least 170 µl, or at least 175 µl, at least 180 µl, or at least 185 µl, at least 190 µl, or at least 195 µl, or at least 200 µl, or at least 300 µl, or at least 400 µl, or at least 500 µl, or at least 600 µl, or at least 700 µl, or at least 800 µl, or at least 900 µl, or at least 1 ml, or at least 2.5 ml or at least 5.0 ml of Optiprep, sucrose, Ficoll, Histopaque, Percoll, trehalose, glycerol, or any combination thereof.

In some aspects wherein the methods of the present disclosure are performed in the 96-well plate, the high-density matrix can comprise at least about 200 µl of Optiprep, sucrose, Ficoll, Histopaque, Percoll, trehalose, glycerol, or any combination thereof. In some aspects wherein the methods of the present disclosure are performed in the 96-well plate, the high-density matrix can comprise at least about 200 µl of Optiprep.

The methods and kits of the present disclosure can concurrently isolate microvesicles from at least two, or at least three, or at least four, or at least five, or at least six, or at least seven or at least eight, or at least nine, or at least 10, or at least 12, or at least 20, or at least 30, or at least 40, or at least 48, or at least 50, or at least 60, or at least 70, or at least 80, or at least 90, or at least 96, or at least 100, or at least 120, or at least 140, or at least 160, or at least 180, or at least 200, or at least 220, or at least 240, or at least 260, or at or at least 280, or at least 300, or at least 320, or at least 340, or at least 360, or at least 380, or at least 384, or at least 400, or at least 500, or at least 600, or at least 700, or at least 800, or at least 900, or at least 1000, or at least 1100, or at least 1200, or at least 1300, or at least 1400 or at least 1500 or at least 1536 biological samples.

In some aspects of the methods and kits of the present disclosure, a biological sample can be incubated with at least one particle that binds to the at least one surface marker under conditions sufficient to form at least one particle-microvesicle complex for at least one hour, or at least two hours, or at least three hours, or at least four hours, or at least five hours, or at least six hours, or at least seven hours, or at least eight hours, or at least nine hours, or at least 10 hours, or at least 11 hours, or at least 12 hours, or at least 13 hours, or at least 14 hours, or at least 15 hours, or at least 16 hours, or at least 17 hours, or at least 18 hours, or at least 19 hours or at least 20 hours, or at least 21 hours, or at least 22 hours, or at least 23 hours, or at least 24 hours. In some aspects of the methods and kits of the present disclosure, incubation with at least one particle (e.g. a magnetic particle) that binds to the at least one surface marker under conditions sufficient to form at least one particle-microvesicle complex (e.g. a magnetic particle-microvesicle complex) can comprise rotation of the biological sample. In some aspects of the methods and kits of the present disclosure, incubation with at least one particle (e.g. a magnetic particle) that binds to the at least one surface marker under conditions sufficient to form at least one particle-microvesicle complex (e.g. a magnetic particle-microvesicle complex) can comprise agitation of the biological sample.

In some aspects of the methods and kits of the present disclosure, an at least one surface marker can be selected from the markers listed in Table 1 or Table 2.

TABLE 1

Surface markers for exosomes derived from particular cells

| Cell of origin | Possible markers |
|---|---|
| Immune cell | CD138, CD38, CD45, CD70 |
| T-cell | CD28, CD3, CD4, CD8, CD215 |
| B-cell | CD 19, CD20 |
| NK cell | CD56, CD10, CD335 |
| Monocyte | CD11, CD123, CD14, CD163, CD33, CD303 |
| Endothelial | CD62E, CD146, CD71, CD144, CD90, CD309, CD31/PCAM, E-Selectin, CD34, VEGFR, CD40L and CD154, VE-cadherin, von Willebrand factor, KDR, FLT1 |
| Epithelial | EpCAM, CD326, CD113, CD118 |
| Platelet | CD62, CD61, CD41, CD42, CD 140 |
| Erythrocyte | CD235, CD233, CD234, CD236, CD241 |
| Neuronal cell | L1CAM, NCAM, DRD5, DRD2, GRIA2, SNAP25, SYP, LNGFR, TRKA, TRKB, TRKC, GRIA1, GRIN1, GRIN2A, GRIN2C, GRIN2D, GRIN3A |
| Cancer cell | CD44, CD 184, PSMA, C-MET, EGFR, CTLA4, PDL1, PDL2, Glypican 1, EGFR v3, IDH1, PD1, STEAPI, SMO, IL1R2, ALCAM, P2RY8, IGFIR, FGFR2, IGF2R, FGFR3, TNFSF4, TNFRSF10C, CD74, IC AMI, ITGAM, MSR1, TNFRSF14, CXCR4, CSF2RA, IL2RG, CD52, FZD1, FAS, TNFRSF1A, CSF1R, IL4R, CD40, NGFR, TNFRSF17, CD79A, TNFRSF8, CD27, CD70, KIT, TNFRSF13, CD59, NCAM1, ADGRB1, ITGA2B, ADRAIB, ALK, CD79B, OR51E2, IL6R, CCR7, S1PR1, CD40LG, FASLG, CXCR2, BMPRIA, F3, DDR2, FGFR1, PDGFRA, ITGB3, IL13RA2, IL1R1, KDR, CDH5, CD36, TNFSF8, CDID, FCGR2B, ACKR3, ITGA5, IL2RA, ITGA4, NRP1, IL2RB, TNFRSF1B, IL7R, CD38, ITGA1, VCAM1, CD14, CSF3R, TNFSF13B, ALC3A2, TFRC, ITGAV, ITGB4, ITGA6, ITGA2, SDC1, CD9, CDH1, CEACAM5, MUCI, CEACAM6, EPCAM, ERBB2, FZD2, CD82, PDGFRB, CD46, FGFR4, TNFRSF12A, PLAUR, TNFRSF10B, IL21R, TNFRSF9, TNFRSF10A, TNFRSF4, ADAM10, TNFSF10, ITGA3, MMA, TNFSF11, SELE, SELL, ITGB1, ENG, PDCD1LG2, TNFRSF10D, CD724, VEGFR1, VEGFR2, VEGFR3, FLT1, FLT3, RET, ROS |
| Embryo | SSEA-4, SSEA-3, PODXL, HSPA8, CD324, KSPG, CD133 |
| Astrocyte | GLAST-1, AQP4 |
| Oligodendrocyte | PLP, O4, MOG |
| Other cell types | Follitin 1, Follitin 2, Integrin 1 Integrin 2, LAMPI, FOLRI, EPHA2, TSG101, Claudin3, HER2, MUC18, CA125, D2-40, CD9, HSP90, CA19-9, CD24 |

TABLE 2

Surface Markers

| PECAM2 | ALCAM | ICAM2 | CD40 | HSP70 |
|---|---|---|---|---|
| RETN | C5AR1 | IL12RB1 | CD40LG | Galectin 5 |
| S100A8 | CD 160 | IL1R2 | CD5 | Galectin 9 |
| SELP | CD 163 | IL2RA | CD6 | Heat shock 70kDa protein 1-like |
| ST6GAL1 | CD 105 | ITGA1 | CD63 | Heat shock 70kDa protein 4-like |
| EPCAM | CDIA | ITGA2 | CD69 | Myeloid-associated differentiation marker 2 |
| TEK | CDIC | ITGA3 | CD7 | Aquaporin-1 |
| TNFRSF4 | CDID | KLRB1 | CD70 | Serglycin |
| TNFRSF8 | CD2 | KLRC1 | CD72 | Aquaporin-4 |
| TPSAB1, TPSB2 | CD209 | KLRD1 | CD74 | Tweety family member 1 |
| VC AMI | CD22 | KRT18 | CD79A | Glycophorin A |
| VWF | CD24 | KRT5 | CD79B | Peptidyl arginine deiminase, type IV |

TABLE 2-continued

Surface Markers

| PECAM2 | ALCAM | ICAM2 | CD40 | HSP70 |
|---|---|---|---|---|
| CD3G | CD244 | KRT8 | CD80 | Peptidoglycan recognition protein 1 |
| MUC2 | CD247 | MS4A1 | CD83 | Chloride channel protein 2 |
| NOS3 | CD28 | MYH10 | CD86 | Sialophorin, CD43 |
| NT5E | CD37 | MYH9 | CD8A | A-125 (MUC-16) or CA19- 9. |
| NCAM1 | CD38 | MYOCD | CD8B | HER2/neu |
| CD96 | CD3D | A-125 (MUC-16) | CA19-9 | N-CAM |
| CA125 | ITGB1 | ITGB2 | polysaccharides | any CD marker |
| amylose | amylopectin | cellulose | lipopoly saccharide | glycosaminoglycan |
| proteoglycans | oligosaccharides | glycoproteins | glycolipids | Lectins |
| ITG4 | AQP8 | PDAC | MUC6 | ASGR1 |
| SLCO1B3 | MS4A3 | KCNJ1 | MUC3 | |

In some aspects of the methods and kits of the present disclosure, a particle (e.g. a magnetic particle) can comprise at least one affinity molecule that binds to an at least one surface marker. An affinity molecule can comprise at least one antibody, at least one antibody fragment, at least one aptamer, at least one aptamer analog, at least one lectin, at least one molecularly imprinted polymer or any combination thereof.

In some aspects of the methods and kits of the present disclosure, a particle can bind to at least one carbohydrate present on the surface of a microvesicle. In some aspects, a particle can comprise at least one lectin that binds to a carbohydrate present on the surface of a microvesicle.

In some aspects of the methods and kits of the present disclosure, a particle (e.g. a magnetic particle) comprises at least one antibody or at least one antibody fragment that binds to an at least one surface marker. In some aspects, the at least one antibody or at least one antibody fragment can be directly (e.g. covalently) coupled to the particle.

In some aspects of the methods and kits of the present disclosure, an at least one antibody or at least one antibody fragment is coupled to a particle (e.g. a magnetic particle) by perfectly base-paired sense and anti-sense oligonucleotides. In some aspects, the perfectly base-paired sense and anti-sense oligonucleotides can comprise at least one restriction enzyme sit. In a non-limiting example, a microvesicle that is bound to an antibody or antibody fragment that is coupled to a particle by perfectly base-paired sense and anti-sense oligonucleotides can be released by the melting of the perfectly base-paired sense and anti-sense oligonucleotides. In another non limiting example, a microvesicle that is bound to an antibody or antibody fragment that is coupled to a particle by perfectly base-paired sense and anti-sense oligonucleotides, wherein the perfectly base-paired sense and anti-sense oligonucleotides comprise at least one restriction enzyme site, can be released by contacting the perfectly base-paired sense and anti-sense oligonucleotide with the appropriate restriction enzyme, thereby cleaving the perfectly base-paired sense and anti-sense oligonucleotides. Without wishing to be bound by theory, these exemplary methods of releasing the microvesicle increase the specificity of microvesicle isolation.

In some aspects of the methods and kits of the present disclosure, an at least one antibody or at least one antibody fragment is coupled to a particle (e.g. a magnetic particle) by a partially double-stranded oligonucleotide. In some aspects, a partially double-stranded oligonucleotide can comprise at least one restriction enzyme site. In a non-limiting example, a microvesicle that is bound to an antibody or antibody fragment that is coupled to a particle by a partially double-stranded oligonucleotide can be released by the melting of the partially double-stranded oligonucleotide. In another non limiting example, a microvesicle that is bound to an antibody or antibody fragment that is coupled to a particle by a partially double-stranded oligonucleotide, wherein the partially double-stranded oligonucleotide comprises at least one restriction enzyme site, can be released by contacting the partially double-stranded oligonucleotide with the appropriate restriction enzyme, thereby cleaving the partially double-stranded oligonucleotide. Without wishing to be bound by theory, these exemplary methods of releasing the microvesicle increase the specificity of microvesicle isolation.

In some aspects of the methods and kits of the present disclosure, an at least one antibody or at least one antibody fragment is coupled to a particle (e.g. a magnetic particle) by a double-stranded oligonucleotide. In some aspects, a double-stranded oligonucleotide can comprise at least one restriction enzyme site. In a non-limiting example, a microvesicle that is bound to an antibody or antibody fragment that is coupled to a particle by a double-stranded oligonucleotide can be released by the melting of the double-stranded oligonucleotide. In another non limiting example, a microvesicle that is bound to an antibody or antibody fragment that is coupled to a particle by a double-stranded oligonucleotide, wherein the double-stranded oligonucleotide comprises at least one restriction enzyme site, can be released by contacting the double-stranded oligonucleotide with the appropriate restriction enzyme, thereby cleaving the double-stranded oligonucleotide. Without wishing to be bound by theory, these exemplary methods of releasing the microvesicle increase the specificity of microvesicle isolation.

In some aspects of the methods and kits of the present disclosure, an at least one antibody or at least one antibody fragment is coupled to a particle (e.g. a magnetic particle) by photo-cleavable linker moiety. In a non-limiting example, a microvesicle that is bound to an antibody or antibody fragment that is coupled to a particle by a photo-cleavable linker moiety can be released by exposing the photo-cleavable linker moiety to light of a wavelength sufficient for cleaving the photo-cleavable linker moiety. Without wishing to be bound by theory, this exemplary methods of releasing the microvesicle increase the specificity of microvesicle isolation.

In some aspects of the methods and kits of the present disclosure, an at least one antibody or at least one antibody fragment is coupled to a particle (e.g. a magnetic particle) by a disulfide bond linker or at least one peptide. In a non-limiting example, a microvesicle that is bound to an antibody or antibody fragment that is coupled to a particle by a disulfide bond linker can be released by the contacting the disulfide bond linker with at least one reducing agent, thereby reducing the disulfide bond linker. In a non-limiting example, a microvesicle that is bound to an antibody or antibody fragment that is coupled to a particle by at least one peptide can be released by contacting the at least one peptide with at least one protease, thereby cleaving the at least one peptide. Without wishing to be bound by theory, this exemplary methods of releasing the microvesicle increase the specificity of microvesicle isolation.

In some aspects of the methods and kits of the present disclosure, a particle can be a magnetic particle. In some aspects, a magnetic particle can comprise a ferromagnetic bead. In some aspects of the methods of the present invention, a magnetic particle can comprise at least one Dynabeads (ThermoFisher); EXO-Flow (SBI); exoCap (MBL), OceanNano (50 nm-100 nm beads), M270 and MyOne (ThermoFisher), Biomag line (Qiagen), Sphero line (Spherotech), LodeStars line and PL-Latex beads (Agilent), MACS line (Miltenyi Biotec), Sepmag line (Sepmag) or any other suitable commercially available magnetic bead. In some aspects, a magnetic particle can comprise resin, agarose, latex, or silicon beads. In some aspects, a magnetic particle can comprise beads comprising protein A, G, A/G, L or any combination thereof. In some aspects, a magnetic particle can comprise beads comprising streptavidin. In some aspects, a magnetic particle can comprise crosslinked (e.g., 4% or 6% densities) beaded agarose, superflow agarose, UltraLink Biosupport (acrylamide-azlactone polymer, ThermoFisher), sugar- or acrylamide-based polymer resin of porous gel support type or any combination thereof. In some aspects, an antibody or at least one antibody fragment can be coupled to a magnetic particle using any suitable means for chemical coupling of antibodies to beads.

In some aspects of the methods and kits of the present disclosure, a particle can be a non-magnetic particle. For these non-magnetic beads or particles, instead of magnetic fields being used to pull-down for magnetic beads, centrifugal force, gravity or pressure are used for the pulldown of the immuno-complexes through the high-density gradient material. By way of example and without any limitation, a non-magnetic particle can comprise at least one crosslinked (e.g., 4% or 6% densities) beaded agarose; superflow agarose; UltraLink Biosupport (acrylamide-azlactone polymer, ThermoFisher); sugar- or acrylamide-based polymer resin of porous gel support type; and protein A, G, A/G, L or any combination thereof.

The methods and kits of the present disclosure are superior to exosome and microvesicle purification techniques and kits known in the art as the methods of the present disclosure can be automated and performed in a high-throughput manner. Accordingly, in some aspects, the methods of the present disclosure can be performed in at least one well of a microwell plate. A microwell plate can be a 6-well plate, a 12-well plate, a 48-well plate, a 96-well plate, a 384-well plate or a 1536-well plate. In preferred aspects, a microwell plate can be a 96-well plate.

The methods and kits of the present disclosure can further comprise removing the biological sample and the high-density matrix from the at least one particle-microvesicle complex (e.g. a magnetic particle-microvesicle complex).

Thus, the present disclosure provides a method of isolating at least one microvesicle comprising at least one surface marker from at least one biological sample, the method comprising: a) incubating the at least one biological sample with at least one particle that binds to the at least one surface marker under conditions sufficient to form at least one particle-microvesicle complex; b) contacting the at least one biological sample with at least one high-density matrix; c) subjecting the at least one biological sample and the at least one high-density matrix to a magnetic field such that the at least one particle-microvesicle complex is translocated through the high-density matrix, thereby isolating at least one microvesicle; and d) removing the biological sample and the high-density matrix from the at least one particle-microvesicle complex.

Figure 2:
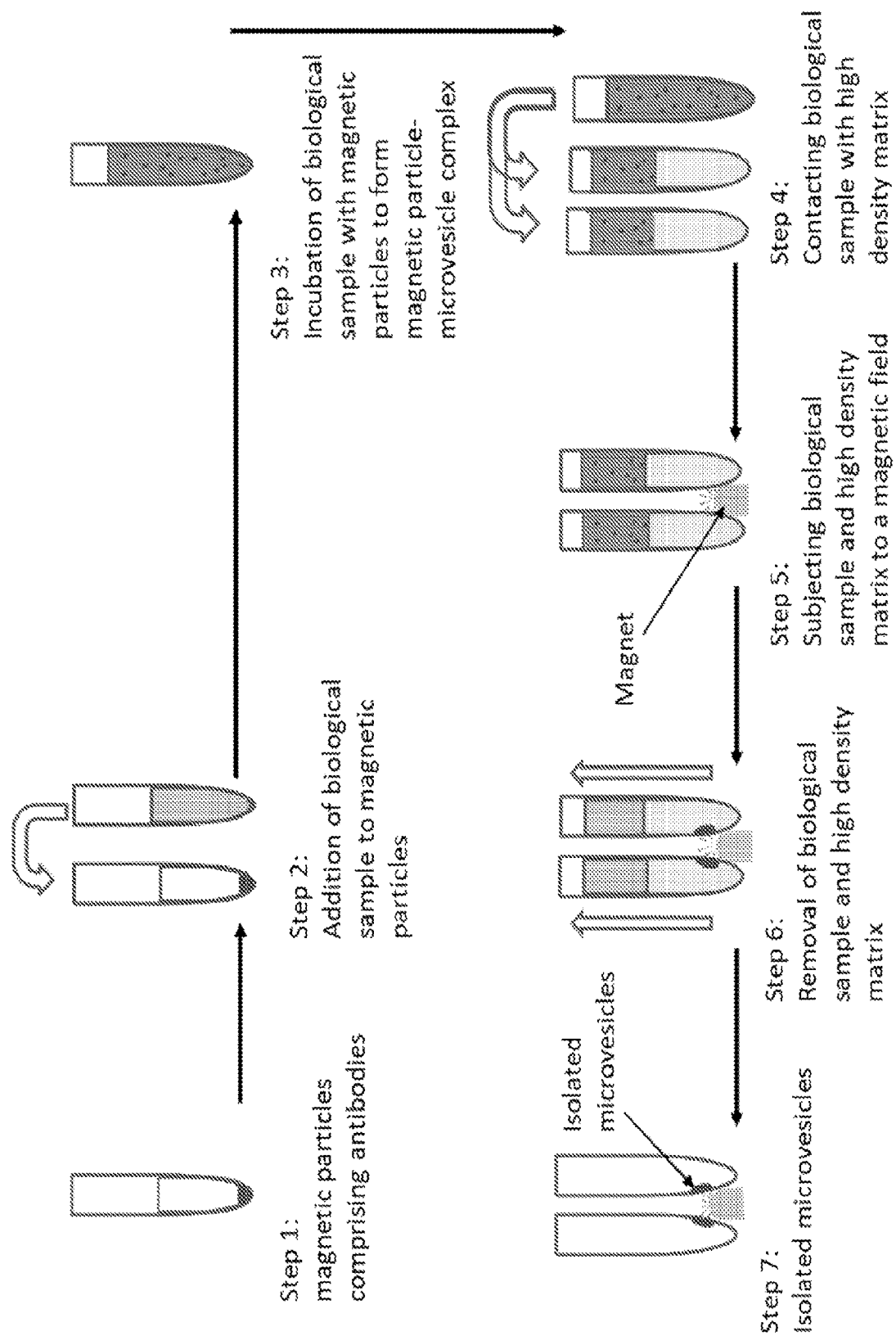
FIG. 2 is an exemplary schematic overview of the microvesicle isolation methods of the present disclosure.

FIG. 2 is an exemplary schematic overview of the preceding method. In step 1, magnetic particles comprising antibodies that bind to a particular surface marker are aliquoted into a tube. In step 2, the biological sample is added to the magnetic particles. In step 3, the magnetic particles and biological sample are incubated together to allow for the formation of at least one magnetic particle-microvesicle complex. In step 4, the biological sample is contacted with a high-density matrix. In step 5, the biological sample and the high-density matrix are subjected to a magnetic field such that the at least one magnetic particle-microvesicle complex is translocated through the high-density matrix. In step 6, the biological sample and the high-density matrix are removed, thereby yielding isolated microvesicles as shown in step 7.

The methods and kits of the present disclosure can further comprise removing at least 10%, or at least 15%, or at least 20%, or at least 25%, or at least 30%, or at least 35%, or at least 40%, or at least 45%, or at least 50%, or at least 55%, or at least 60%, or at least 65%, or at least 70%, or at least 75%, or at least 80%, or at least 85%, or at least 90%, or at least 95%, or at least 99%, or at least 99.5%, or at least 100 of the biological sample from the at least one particle-microvesicle complex (e.g. a magnetic particle-microvesicle complex).

The methods and kits of the present disclosure can further comprise removing at least 10%, or at least 15%, or at least 20%, or at least 25%, or at least 30%, or at least 35%, or at least 40%, or at least 45%, or at least 50%, or at least 55%, or at least 60%, or at least 65%, or at least 70%, or at least 75%, or at least 80%, or at least 85%, or at least 90%, or at least 95%, or at least 99%, or at least 99.5%, or at least 100% of the high-density matrix from the sequestered at least one particle-microvesicle complex (e.g. a magnetic particle-microvesicle complex).

In some aspects of the methods and kits of the present disclosure, removing the biological sample and/or removing the high-density matrix from the at least one particle-microvesicle complex (e.g. a magnetic particle-microvesicle complex) can comprise aspiration.

In some aspects of the methods and kits of the present disclosure, prior to incubating the at least one biological sample with at least one particle (e.g. a magnetic particle) that binds to the at least one surface marker under conditions sufficient to form at least one particle-microvesicle complex (e.g. a magnetic particle-microvesicle complex), the at least one particle (e.g. a magnetic particle) that binds to the at least one surface maker can be reconstituted in at least one diluent.

Figure 3:
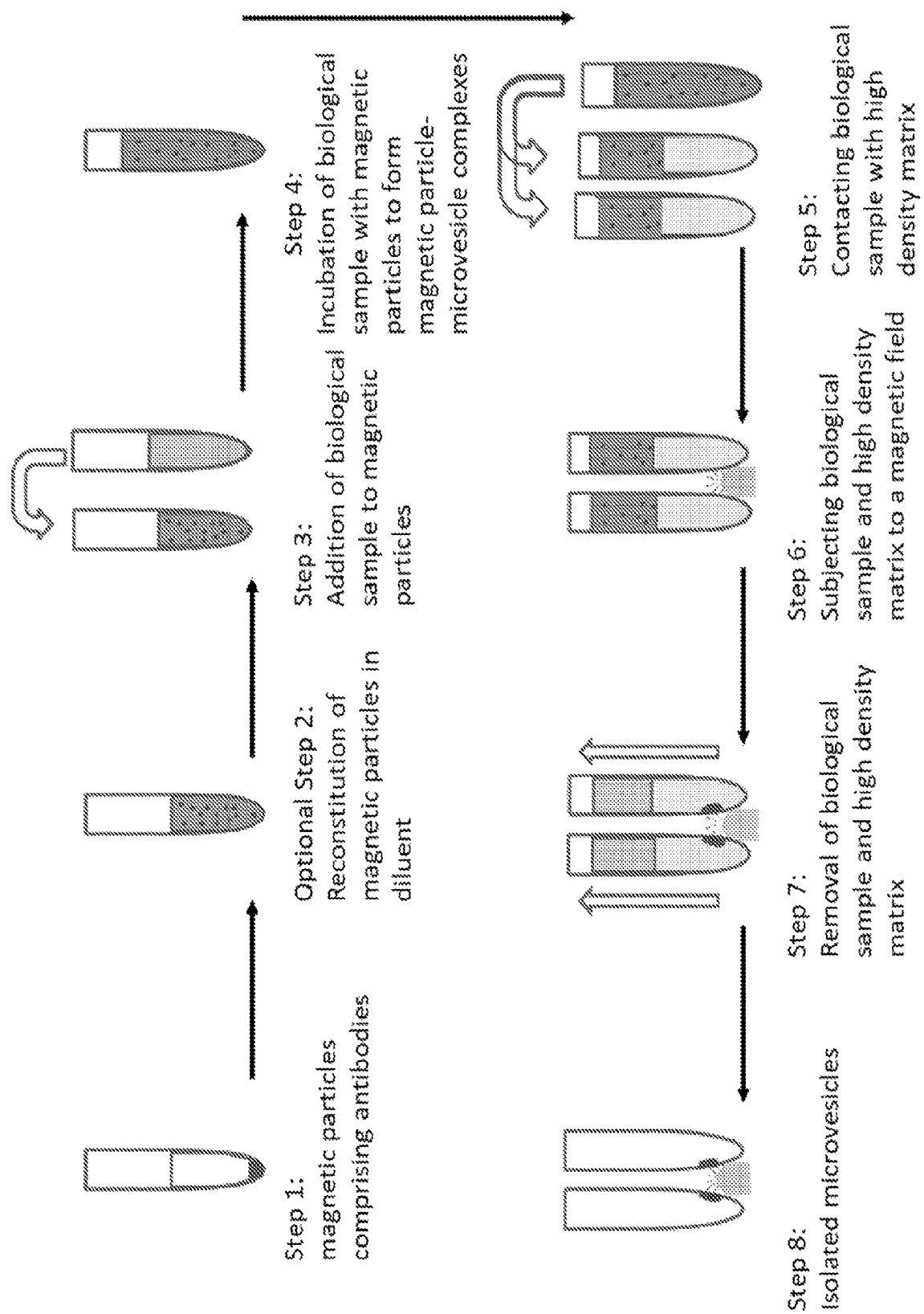
FIG. 3 is an exemplary schematic overview of the microvesicle isolation methods of the present disclosure.

FIG. 3 is an exemplary schematic overview of the preceding method. In step 1, magnetic particles comprising antibodies that bind to a particular surface marker are aliquoted into a tube. In step 2, the magnetic particles are reconstituted in a diluent. In step 3, the biological sample is added to the reconstituted magnetic particles. In step 4, the magnetic particles and biological sample are incubated together to allow for the formation of at least one magnetic particle-microvesicle complex. In step 5, the biological sample is contacted with a high-density matrix. In step 6, the biological sample and the high-density matrix are subjected to a magnetic field such that the at least one magnetic particle-microvesicle complex is translocated through the high-density matrix. In step 7, the biological sample and the high-density matrix are removed, thereby yielding isolated microvesicles as shown in step 8.

In some aspects, the methods and kits of the present disclosure can isolate at least about 80% of the surface marker-specific microvesicles present in the biological sample. A surface marker-specific microvesicle is a microvesicle that comprises that at least one surface marker to which the at least one particle binds. For example, in methods and kits of the present disclosure that use a particle that binds to surface marker CD138, the methods of the present disclosure can isolate at least about 80% of the microvesicles present in the biological sample that comprise CD138. In some aspects, the methods and kits of the present disclosure can isolate at least about 90% of the surface marker-specific microvesicles present in the biological sample. In some aspects, the methods and kits of the present disclosure can isolate at least about 95% of the surface marker-specific microvesicles present in the biological sample. In some aspects, the methods of the present disclosure can isolate at least about 99% of the surface marker-specific microvesicles present in the biological sample. In some aspects, the methods and kits of the present disclosure can isolate at least about 99.5% of the surface marker-specific microvesicles present in the biological sample.

In some aspects, the methods and kits of the present disclosure can isolate at least about 1%, or at least about 5%, at least about 10%, or at least about 15%, or at least about 20%, or at least about 25%, or at least about 30%, or at least about 35%, or at least about 40%, or at least about 45%, or at least about 50%, or at least about 55%, or at least about 60%, or at least about 65%, or at least about 70% or at least about 75% of the surface marker-specific microvesicles present in the biological sample.

In some aspects, the methods and kits of the present disclosure can isolate at least about 1%, or at least about 5%, at least about 10%, or at least about 15%, or at least about 20%, or at least about 25%, or at least about 30%, or at least about 35%, or at least about 40%, or at least about 45%, or at least about 50%, or at least about 55%, or at least about 60%, or at least about 65%, or at least about 70% or at least about 75%, or at least about 80%, or at least about 85%, or at least about 90%, or at least about 95%, or at least about 99%, or at least about 99.5% of microvesicles present in the biological sample that are derived from a specific cell type or a plurality of specific cell types.

In some aspects, the methods and kits of the present disclosure can isolate at least about 0.001%, or at least about 0.005%, or at least about 0.01%, or at least about 0.05%, or at least about 0.1%, or at least about 0.5%, or at least about 1%, or at least about 5%, or at least about 10%, or at least about 15%, or at least about 20%, or at least about 25%, or at least about 30%, or at least about 35%, or at least about 40%, or at least about 45%, or at least about 50%, or at least about 55%, or at least about 60%, or at least about 65%, or at least about 70% or at least about 75% of the microvesicles present in the biological sample.

In some aspects, microvesicles isolated using the methods or kits of the present disclosure can be used in a method for the diagnosis of, prognosis of and/or therapy-selection for at least one disease or disorder in a subject. In some aspects, the methods and kits of the present disclosure allow for increased sensitivity and/or specificity of the diagnosis, prognosis, and/or therapy-selection method. In a non-limiting example, the microvesicles isolated using any method or kit of the present disclosure can be used in a diagnostic, prognostic and/or therapy-selection method, wherein the method has a sensitivity of at least about 70%, or at least about 75%, or at least about 80%, or at least about 85%, or at least about 90%, or at least about 95%, or at least about 99%, or at least about 99.5%. In another non-limiting example, the microvesicles isolated using any method or kit of the present disclosure can be used in a diagnostic, prognostic and/or therapy-selection method, wherein the method has a specificity of at least about 70%, or at least about 75%, or at least about 80%, or at least about 85%, or at least about 90%, or at least about 95%, or at least about 99%, or at least about 99.5%.

In some aspects of the methods and kits of the present disclosure, a biological sample can comprise blood, serum, plasma, urine, cerebrospinal fluid or any combination thereof. A biological sample can be obtained from virtually any organism including multicellular organisms, e.g., of the plant, fungus, and animal kingdoms; preferably, the sample is obtained from an animal, e.g., a mammal. A biological sample can be obtained from a human.

In some aspects of the methods and kits of the present disclosure, the biological sample can comprise a bodily fluid. A bodily fluid can be fluids isolated from anywhere in the body of a subject, such as, for example, a peripheral location, including but not limited to, for example, blood, plasma, serum, urine, sputum, spinal fluid, cerebrospinal fluid, pleural fluid, nipple aspirates, lymph fluid, fluid of the respiratory, intestinal, and genitourinary tracts, tear fluid, saliva, breast milk, fluid from the lymphatic system, semen, intra-organ system fluid, ascitic fluid, tumor cyst fluid, amniotic fluid and cell culture supernatant, and combinations thereof. Biological samples can also include fecal or cecal samples, or supernatants isolated therefrom.

In some aspects of the methods and kits of the present disclosure, the biological sample can be no more than about 0.01 ml, or about 0.1 ml, or about 0.2 ml, or about 0.3 ml, or about 0.4 ml, or about 0.5 ml, or about 0.6 ml, or about 0.7 ml, or about 0.8 ml, or about 0.9 ml, or about 1.0 ml, or about 1.1 ml, or about 1.2 ml, or about 1.3 ml, or about 1.4 ml, or about 1.5 ml, or about 1.6 ml, or about 1.7 ml, or about 1.8 ml, or about 1.9 ml, or about 2.0 ml, or about 3 ml, or about 4 ml, or about 5 ml, or about 6 ml, or about 7 ml, or about 8 ml, or about 9 ml, or about 10 ml in volume.

In some aspects of the methods and kits of the present disclosure, the biological sample can be at least about 0.01 ml, or about 0.1 ml, or about 0.2 ml, or about 0.3 ml, or about 0.4 ml, or about 0.5 ml, or about 0.6 ml, or about 0.7 ml, or about 0.8 ml, or about 0.9 ml, or about 1.0 ml, or about 1.1 ml, or about 1.2 ml, or about 1.3 ml, or about 1.4 ml, or about 1.5 ml, or about 1.6 ml, or about 1.7 ml, or about 1.8 ml, or about 1.9 ml, or about 2.0 ml, or about 3 ml, or about 4 ml, or about 5 ml, or about 6 ml, or about 7 ml, or about 8 ml, or about 9 ml, or about 10 ml in volume.

In some aspects of the methods and kits of the present disclosure, a biological sample can be pre-filtered prior to the addition of the at least one particle (e.g. a magnetic particle). Pre-filtering can be performed using a filter with a pore size of about 0.22 µm. Pre-filtering can be performed using a filter with a pore size of about 0.8 µm. Pre-filtering can be performed using a filter with a pore size of about 0.1 µm, or about 0.2 µm, or about 0.3 µm, or about 0.4 µm, or about 0.5 µm, or about 0.6 µm, or about 0.7 µm, or about 0.8 µm, or about 0.9 µm, or about 1.0 µm, or about 1.5 µm, or about 2.0 µm, or about 2.5 µm, or about 3.0 µm, or about 3.5 µm, or about 4.0 µm, or about 4.5 µm, or about 5.0 µm. In some aspects of the methods of the present disclosure, a biological sample can be pre-processed such that cells and/or cellular debris are removed prior to the isolation of at least one microvesicle or a microvesicle fraction. Pre-processing can comprise filtering, centrifugation or any combination thereof.

In some aspects, the methods and kits of the present disclosure can further comprise extracting at least one nucleic acid from the isolated at least one microvesicle. Thus, the present disclosure provides a method of isolating at least one microvesicle comprising at least one surface marker from at least one biological sample, the method comprising: a) incubating the at least one biological sample with at least one particle that binds to the at least one surface marker under conditions sufficient to form at least one particle-microvesicle complex; b) contacting the at least one biological sample with at least one high-density matrix; c) subjecting the at least one biological sample and the at least one high-density matrix to at least one force such that the at least one particle-microvesicle complex is translocated through the high-density matrix, thereby isolating at least one microvesicle; and d) extracting at least one nucleic acid from the isolated at least one microvesicle. The present disclosure also provides a method of isolating at least one microvesicle comprising at least one surface marker from at least one biological sample, the method comprising: a) incubating the at least one biological sample with at least one magnetic particle that binds to the at least one surface marker under conditions sufficient to form at least one magnetic particle-microvesicle complex; b) contacting the at least one biological sample with at least one high-density matrix; c) subjecting the at least one biological sample and the at least one high-density matrix to a magnetic field such that the at least one magnetic particle-microvesicle complex is translocated through the high-density matrix, thereby isolating at least one microvesicle; and d) extracting at least one nucleic acid from the isolated at least one microvesicle. An at least one nucleic acid can comprise RNA, RNA or a combination of RNA and DNA.

In some aspects, the methods and kits of the present disclosure can further comprise extracting at least one protein from the isolated at least one microvesicle. Thus, the present disclosure provides a method of isolating at least one microvesicle comprising at least one surface marker from at least one biological sample, the method comprising: a) incubating the at least one biological sample with at least one particle that binds to the at least one surface marker under conditions sufficient to form at least one particle-microvesicle complex; b) contacting the at least one biological sample with at least one high-density matrix; c) subjecting the at least one biological sample and the at least one high-density matrix to at least one force such that the at least one particle-microvesicle complex is translocated through the high-density matrix, thereby isolating at least one microvesicle; and d) extracting at least one protein from the isolated at least one microvesicle. The present disclosure also provides a method of isolating at least one microvesicle comprising at least one surface marker from at least one biological sample, the method comprising: a) incubating the at least one biological sample with at least one magnetic particle that binds to the at least one surface marker under conditions sufficient to form at least one magnetic particle-microvesicle complex; b) contacting the at least one biological sample with at least one high-density matrix; c) subjecting the at least one biological sample and the at least one high-density matrix to a magnetic field such that the at least one magnetic particle-microvesicle complex is translocated through the high-density matrix, thereby isolating at least one microvesicle; and d) extracting at least one protein from the isolated at least one microvesicle.

In some aspects, the methods and kits of the present disclosure can further comprise extracting at least one lipid from the isolated at least one microvesicle. Thus, the present disclosure provides a method of isolating at least one microvesicle comprising at least one surface marker from at least one biological sample, the method comprising: a) incubating the at least one biological sample with at least one particle that binds to the at least one surface marker under conditions sufficient to form at least one particle-microvesicle complex; b) contacting the at least one biological sample with at least one high-density matrix; c) subjecting the at least one biological sample and the at least one high-density matrix to at least one force such that the at least one particle-microvesicle complex is translocated through the high-density matrix, thereby isolating at least one microvesicle; and d) extracting at least one lipid from the isolated at least one microvesicle. The present disclosure also provides a method of isolating at least one microvesicle comprising at least one surface marker from at least one biological sample, the method comprising: a) incubating the at least one biological sample with at least one magnetic particle that binds to the at least one surface marker under conditions sufficient to form at least one magnetic particle-microvesicle complex; b) contacting the at least one biological sample with at least one high-density matrix; c) subjecting the at least one biological sample and the at least one high-density matrix to a magnetic field such that the at least one magnetic particle-microvesicle complex is translocated through the high-density matrix, thereby isolating at least one microvesicle; and d) extracting at least one lipid from the isolated at least one microvesicle.

In some aspects, the methods and kits of the present disclosure can further comprise extracting at least one carbohydrate molecule from the isolated at least one microvesicle. Thus, the present disclosure provides a method of isolating at least one microvesicle comprising at least one surface marker from at least one biological sample, the method comprising: a) incubating the at least one biological sample with at least one particle that binds to the at least one surface marker under conditions sufficient to form at least one particle-microvesicle complex; b) contacting the at least one biological sample with at least one high-density matrix; c) subjecting the at least one biological sample and the at least one high-density matrix to at least one force such that the at least one particle-microvesicle complex is translocated through the high-density matrix, thereby isolating at least one microvesicle; and d) extracting at least one carbohydrate molecule from the isolated at least one microvesicle. The present disclosure also provides a method of isolating at least one microvesicle comprising at least one surface marker from at least one biological sample, the method comprising: a) incubating the at least one biological sample with at least one magnetic particle that binds to the at least one surface marker under conditions sufficient to form at least one magnetic particle-microvesicle complex; b) contacting the at least one biological sample with at least one high-density matrix; c) subjecting the at least one biological sample and the at least one high-density matrix to a magnetic field such that the at least one magnetic particle-microvesicle complex is translocated through the high-density matrix, thereby isolating at least one microvesicle; and d) extracting at least one carbohydrate molecule from the isolated at least one microvesicle.

In some aspects of the methods and kits of the present disclosure, a biological sample is contacted with at least one high-density matrix such that the ratio of the volume of biological sample to the volume of high-density matrix is about 1:1, or about 1:2, or about 1:3, or about 1:4, or about 1:5, or about 1:6, or about 1:7, or about 1:8, or about 1:10, or about 1:20, or about 1:30, or about 1:40, or about 1:50, or about 1:60, or about 1:70, or about 1:80, or about 1:100.

In some aspects of the methods and kits of the present disclosure, a biological sample is contacted with at least one high-density matrix such that the ratio of the volume of high-density matrix to the volume of biological sample is about 1:1, or about 1:2, or about 1:3, or about 1:4, or about 1:5, or about 1:6, or about 1:7, or about 1:8, or about 1:10, or about 1:20, or about 1:30, or about 1:40, or about 1:50, or about 1:60, or about 1:70, or about 1:80, or about 1:100.

The term "magnetic particle-microvesicle complex" is used in its broadest sense to refer to any complex formed when a magnetic particle binds, either directly or indirectly, to at least one microvesicle. A magnetic particle-microvesicle complex can comprise any number of microvesicles bound to a single magnetic particle. A magnetic particle-microvesicle complex can comprise any number of magnetic particles bound to any number of microvesicles.

The term "particle-microvesicle complex" is used in its broadest sense to refer to any complex formed when a particle binds, either directly or indirectly, to at least one microvesicle. A particle-microvesicle complex can comprise any number of microvesicles bound to a single particle. A particle-microvesicle complex can comprise any number of particles bound to any number of microvesicles.

The term "translocate" is used in its broadest sense to refer to the movement of a particle or complex through any type of medium. The movement can be directed or the movement can be random.

In some aspects of the methods and kits of the present disclosure, contacting the at least one biological sample with at least one high-density matrix can comprise layering the biological sample on top of the high-density matrix such that two distinct phases are created: a biological sample phase on top and the high-density matrix phase on the bottom. This layering is schematically depicted in step 4 of FIG. 1. In some aspects, the layering ensures that there is little to no mixing of the high-density matrix and the biological sample prior to the addition of the force (e.g. a magnetic field). In some aspects, layering can cause some mixing of the biological sample and the high-density matrix. Without wishing to be bound by theory, by layering the biological sample and the high-density matrix, the application of the force (e.g. magnetic field) causes any particle-microvesicle complexes (e.g. magnetic particle-microvesicle complexes) to translocate into and through the high-density matrix phase, thereby purifying the particle-microvesicle complex by removing contaminants, including, but not limited to, cellular debris, unwanted lipids, unwanted proteins, unwanted nucleic acids or any combination thereof. Without wishing to be bound by theory, the translocation of the particle-microvesicle complex removes the need for any subsequent washing steps in the methods of the present disclosure.

The term "antibody" herein is used in the broadest sense and encompasses various antibody structures, including but not limited to monoclonal antibodies, polyclonal antibodies, multispecific antibodies (e.g., bispecific antibodies), and antibody fragments so long as they exhibit the desired antigen-binding activity. An antibody that binds to a target refers to an antibody that is capable of binding the target with sufficient affinity such that the antibody is useful as a diagnostic and/or therapeutic agent in targeting the target. In one aspect, the extent of binding of an anti-target antibody to an unrelated, non-target protein is less than about 10% of the binding of the antibody to target as measured, e.g., by a radioimmunoassay (RIA) or biacore assay. In certain aspects, an antibody that binds to a target has a dissociation constant (Kd) of <1 µM, <100 nM, <10 nM, <1 nM, <0.1 nM, <0.01 nM, or <0.001 nM (e.g. $10^8$ M or less, e.g. from $10^8$ M to $10^{13}$ M, e.g., from $10^9$ M to $10^{13}$ M). In certain aspects, an anti-target antibody binds to an epitope of a target that is conserved among different species.

An "antibody fragment" refers to a molecule other than an intact antibody that comprises a portion of an intact antibody that binds the antigen to which the intact antibody binds. Examples of antibody fragments include but are not limited to Fv, Fab, Fab', Fab'-SH, F(ab')2; diabodies; linear antibodies; single-chain antibody molecules (e.g. scFv); and multispecific antibodies formed from antibody fragments.

Following the isolation of microvesicles from a biological sample, nucleic acid may be extracted from the isolated or enriched extracellular vesicle fraction. To achieve this, the extracellular vesicles may first be lysed. The lysis of extracellular vesicles and extraction of nucleic acids may be achieved with various methods known in the art, including those described in PCT Publication Nos. WO 2016/007755, WO 2014/107571 and WO/2017/197399, the contents of each of which are hereby incorporated by reference in their entirety. Nucleic acid extraction may be achieved using protein precipitation according to standard procedures and techniques known in the art. Such methods may also utilize a nucleic acid-binding column to capture the nucleic acids contained within the extracellular vesicles. Once bound, the nucleic acids can then be eluted using a buffer or solution suitable to disrupt the interaction between the nucleic acids and the binding column, thereby eluting the nucleic acids.

Nucleic acids may be extracted from isolated microvesicles using a phenol-based lysis reagent. In some aspects, nucleic acids may be extracted from isolated microvesicles using phenol-free lysis reagents. In some aspects, nucleic acids may be extracted from isolated microvesicles using guanidine thiocyanate (GTC)-based lysis reagents.

Exosomal derived nucleic acids can include RNA or DNA, either individually or as a mixture of RNA and DNA. Exosomal derived nucleic acids can include material either contained within or bound to the outer surface of exosomes. The DNA component can be exosomal or other cell-free sources (cfDNA).

Where an extracellular vesicle fraction is utilized, isolation and extraction of nucleic acids, e.g., DNA and/or DNA and nucleic acids including at least RNA from a sample using the following general procedure. First, the nucleic acids in the sample, e.g., the DNA and/or the DNA and the extracellular vesicle fraction, are bound to a capture surface such as a membrane filter, and the capture surface is washed. Then, an elution reagent is used to perform on-membrane lysis and release of the nucleic acids, e.g., DNA and/or DNA and RNA, thereby forming an eluate. The eluate is then contacted with a protein precipitation buffer that includes a transition metal and a buffering agent. The cfDNA and/or DNA and nucleic acids include at least the RNA from the extracellular vesicles is then isolated from the proteinprecipitated eluate using any of a variety of art-recognized techniques, such as, for example, binding to a silica column followed by washing and elution.

The elution buffer may comprise a denaturing agent, a detergent, a buffer substance, and/or combinations thereof to maintain a defined solution pH. The elution buffer may include a strong denaturing agent, or even a strong denaturing agent and a reducing agent.

In some aspects, the extracted nucleic acid(s) are subjected to downstream analysis, for example, to measure and/or compare levels of expression to predetermined thresholds. For example, at least one biomarker (i.e. —one or more), such as a group of genes, may be identified as a signature by analyzing clinical samples procured with stringent inclusion and exclusion criteria for the intended clinical utility. On a per-sample basis, a continuous or discrete score may be derived by performing a statistical classification analysis including but not limited to random forest, logistic regression and neural network. On this score, a threshold is defined that separates intended sample groups for the clinical utility with an acceptable clinical specificity and sensitivity.

In some aspects, control particles may be added to the sample prior to EV isolation and/or nucleic acid extraction to serve as an internal control to evaluate the efficiency or quality of EV purification and/or proteins and nucleic acid extraction. The methods described herein provide for the efficient isolation and the control particles along with the EV fraction.

These control particles include Q-beta bacteriophage, virus particles, or any other particle that contains control proteins and nucleic acids (e.g., at least one control target gene or protein) that may be naturally occurring or engineered by recombinant DNA techniques, or by liposome vesicle encapsulation technologies such as with engineered at least one surface protein and at least one control target nucleic acid or at least one control target protein being encapsulated inside the liposomal vesicles. In some aspects, the quantity of control particles is known before the addition to the sample. The control target gene or control target protein can be quantified using real-time PCR, ELISA, or Western blot analysis.

Quantification of a control target gene or a control target protein can be used to determine the efficiency or quality of the EV purification, protein or nucleic acid extraction processes.

In some aspects, the methods and kits described herein include one or more in-process controls. In some aspects, the in-process control is detection and analysis of a reference gene that indicates plasma quality (i.e., an indicator of the quality of the plasma sample). In some aspects, the reference gene(s) is/are a plasma-inherent transcript. In some aspects, the reference gene(s) is/are analyzed by additional qPCR. In some aspects, the in-process control is detection and analysis of extracellular vesicle protein. The reference protein is/are analyzed by additional ELISA or Western blot.

In some aspects, the nucleic acids described herein comprise DNA or RNA. Examples of RNA include messenger RNAs, long non-coding RNAs, transfer RNAs, ribosomal RNAs, small RNAs (non-protein-coding RNAs, non-messenger RNAs), microRNAs, piRNAs, snRNAs, snoRNAs, and Y-RNAs. In some aspects, the nucleic acids are isolated from or are otherwise derived from EVs or from one or more subpopulations of EVs. In some aspects, the nucleic acids are cell-free nucleic acids, also referred to herein as circulating nucleic acids. In some aspects, the cell-free nucleic acids are DNA or RNA.

As used herein, the term "nucleic acids" refer to DNA and RNA unless otherwise specified. The nucleic acids can be single stranded or double stranded. In some instances, the nucleic acid is DNA. In some instances, the nucleic acid is RNA. RNA includes, but is not limited to, messenger RNA, transfer RNA, ribosomal RNA, non-coding RNAs, microRNAs, and HERV elements.

EXAMPLES

Example 1

Without wishing to be bound by theory, the following example demonstrates that the methods of the present disclosure can be used to specifically enrich microvesicles that comprise a specific surface marker and that the contents of these enriched microvesicles can be further analyzed.

In this experiment, microvesicles were isolated from a plasma sample. As a control, parallel isolations were performed using either A) magnetic beads comprising streptavidin (negative control); B) magnetic beads conjugated to IgG (negative control); and C) beads conjugated to anti-glycophorin A (GYPA) antibodies. Additionally, a process negative control isolation was also performed. For the process negative control isolation, a sample was incubated with assay diluent in the absence of beads. The sample/diluent mixture then undergoes the same steps as samples that were incubated with beads. Briefly, the magnetic beads were incubated with the plasma sample to allow the formation of magnetic particle-microvesicle complexes. After incubation, the plasma sample was layered onto a high-density matrix comprising Optiprep. The plasma sample and the high-density matrix were then subjected to a magnetic field to cause the magnetic beads to translocate through the high-density matrix.

Figure 4:
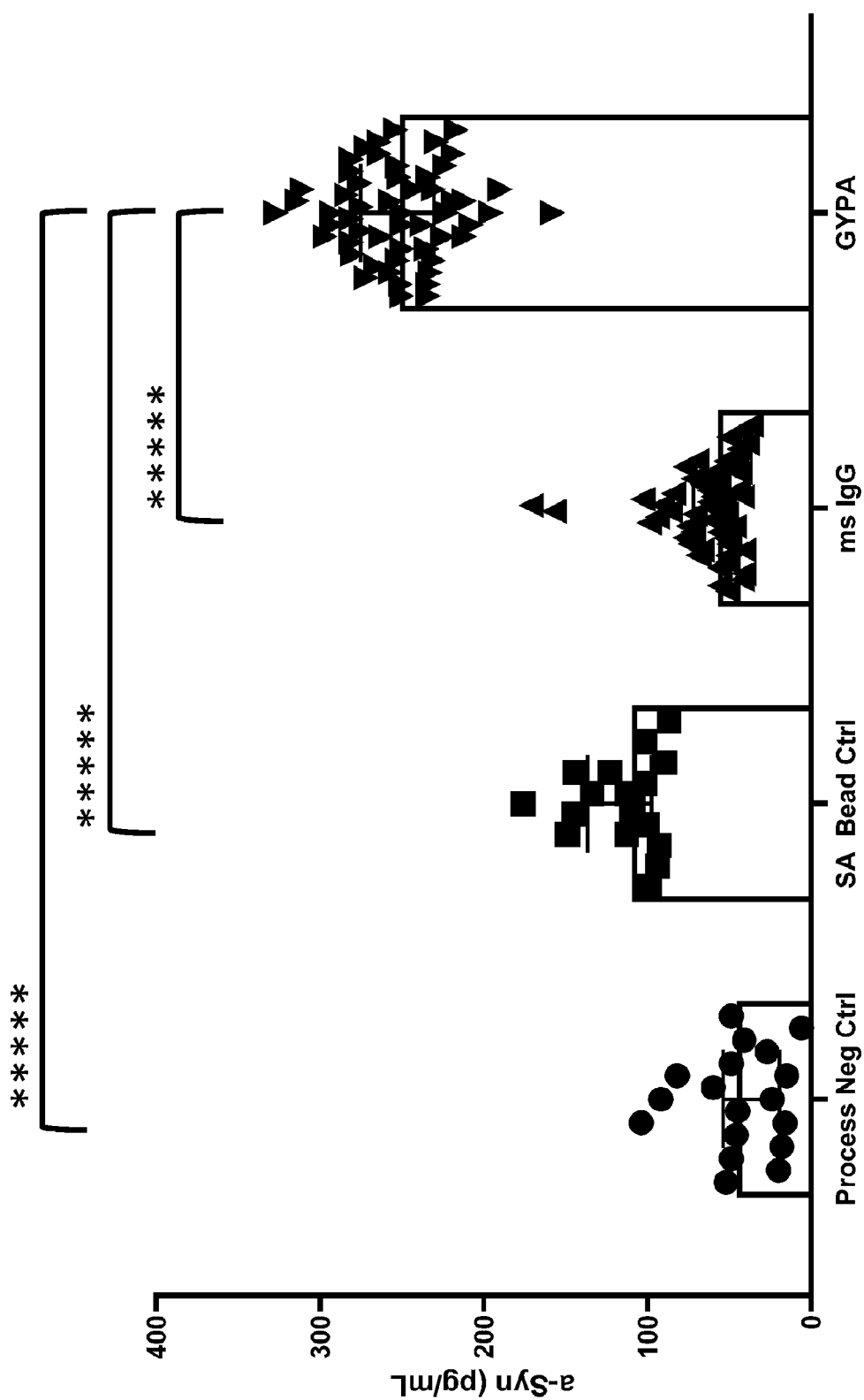
FIG. 4 is a chart showing the amount of microvesicular alpha-synuclein protein recovered using the microvesicle isolation methods of the present disclosure.

The protein contents of the isolated microvesicles were then extracted and analyzed. The amount of alpha-synuclein extracted from the exosomes was quantified. As shown in FIG. 4 and Table 3, and average of 251 pg/ml of alpha-synuclein (SD: 33, CV: 13) was recovered using the magnetic beads conjugated to anti-GYPA antibodies. In contrast, an average of 64 pg/ml (SD: 25, CV: 39) and 116 pg/ml (SD: 25, CV: 21) of alpha-synuclein was recovered using the magnetic beads conjugated to IgG and the magnetic beads comprising streptavidin respectively. These results show that the methods of the present disclosure can specifically and efficiently recover microvesicles from a biological sample in a quantity and purity that allows for subsequent analysis of the microvesicular contents.

TABLE 3

|  | Process Control | Beads comprising Streptavidin | Beads conjugated to IgG | Beads conjugated to anti-GYPA |
|---|---|---|---|---|
| AVG | 44 pg/ml | 116 pg/ml | 64 pg/ml | 251 pg/ml |
| SD | 27 pg/ml | 25 pg/ml | 25 pg/ml | 33 pg/ml |
| CV | 62 | 21 | 39 | 13 |

Example 2

The following is an example that describes an experiment that compares the microvesicle isolation methods of the present disclosure to existing immunoaffinity-based microvesicle isolation methods.

In this experiment, microvesicles were isolated from a plasma sample. As a control, parallel isolations were performed using either A) magnetic beads comprising streptavidin (negative control); B) magnetic beads conjugated to IgG (negative control); and C) beads conjugated to anti-glycophorin A (GYPA) antibodies. Additionally, a process negative control isolation was also performed. For the process negative control isolation, a sample was incubated with assay diluent in the absence of beads. The sample/diluent mixture then undergoes the same steps as samples that were incubated with beads. Briefly, the magnetic beads were incubated with the plasma sample to allow the formation of magnetic particle-microvesicle complexes. After incubation, the plasma sample was layered onto a high-density matrix comprising Optiprep. The plasma sample and the high-density matrix were then subjected a magnetic field to cause the magnetic beads to translocate through the high-density matrix.

Figure 5:
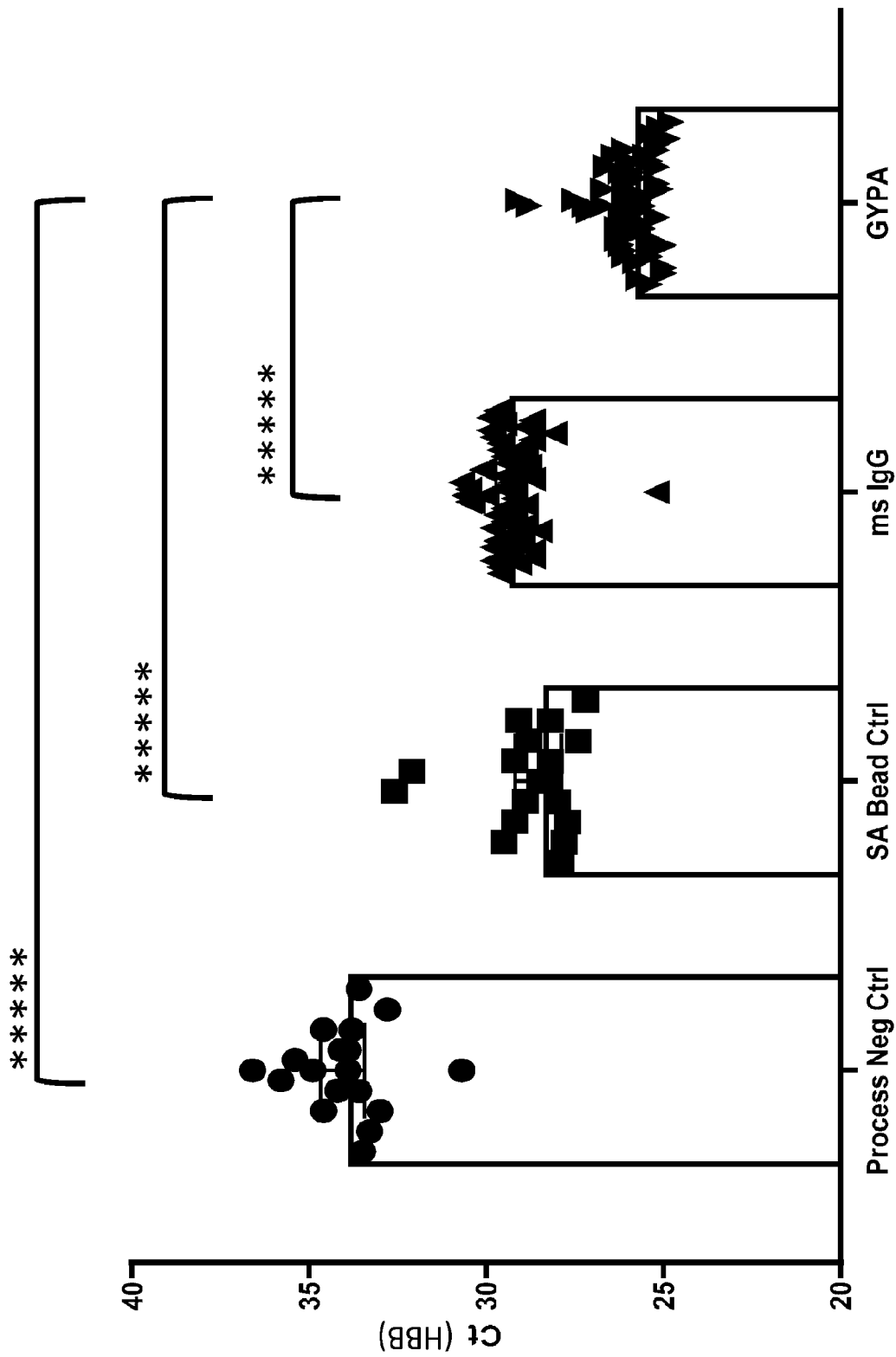
FIG. 5 is a chart showing the amount of microvesicular beta-globin RNA, expressed as a cycle threshold value, recovered using the microvesicle isolation methods of the present disclosure.

The nucleic acid contents of the isolated microvesicles were then extracted and analyzed. The amount of beta-globin (HBB) RNA extracted from the exosomes was then quantified using quantitative PCR. The output of the quantitative PCR is defined as a cycle threshold value, which is the PCR cycle number when the fluorescence of a PCR product can be detected above the background signal. Thus, the more mRNA that is extracted and recovered from the exosomes, the smaller the Ct value should be. As shown in FIG. 5 and in Table 4, the median Ct value of the HBB RNA recovered using the magnetic beads conjugated to anti-GYP was 25.8 (SD: 0.8). In contrast, a median Ct value of 29.4 (SD: 0.8) and 28.4 (1.5) was measured for the HBB RNA recovered using the magnetic beads conjugated to IgG and the magnetic beads comprising streptavidin respectively. Thus, the difference between the negative control IgG signal and the anti-GYPA signal (herein referred to as dCt) was 3.6.

TABLE 4

|  | Process Control | Beads comprising Streptavidin | Beads conjugated to IgG | Beads conjugated to anti-GYPA |
| --- | --- | --- | --- | --- |
| AVG | 33.9 | 28.4 | 29.4 | 25.8 |
| SD | 1.3 | 1.5 | 0.8 | 0.8 |

As a comparison, in an experiment using existing immunoaffinity-based microvesicle isolation methods, microvesicles were isolated using magnetic beads conjugated to anti-GYPA antibodies or magnetic beads conjugated to mouse IgG (negative control). The existing immunoaffinity-based microvesicle isolation methods do not use a high-density matrix and instead rely on repeated washing of the magnetic beads to purify the desired microvesicles. The results of the existing immunoaffinity-based isolation experiments are shown in Table 5.

TABLE 5

|  | Beads conjugated to anti-GYPA | Beads conjugated to mouse IgG |
| --- | --- | --- |
| Number of Values | 10 | 10 |
| Minimum | 26.5 | 28.5 |
| 25% Percentile | 26.7 | 28.9 |
| Median | 28.5 | 30.9 |
| 75% Percentile | 29.0 | 32.0 |
| Maximum | 29.4 | 32.6 |
| Mean | 28.0 | 30.5 |
| Std. Deviation | 1.2 | 1.6 |

TABLE 5-continued

|  | Beads conjugated to anti-GYPA | Beads conjugated to mouse IgG |
| --- | --- | --- |
| Std. Error | 0.4 | 0.5 |
| Lower 95% CI of mean | 27.2 | 29.4 |
| Upper 95% CI of mean | 28.9 | 31.7 |

The microvesicle isolation methods of the present disclosure demonstrate an improved and superior dCt of 3.6, while the existing immunoaffinity-based isolation methods demonstrate a dCt of 2.4.

Thus, the results described in this example demonstrate that the microvesicle isolation methods of the present disclosure can be used to isolate and enrich microvesicles that comprise a specific surface marker and that the microvesicle isolation methods of the present disclosure are more efficient manner as compared to existing immunoaffinity-based isolation methods.

Example 3

Without wishing to be bound by theory, the following example demonstrates that the microvesicle isolation methods of the present disclosure can be used to enrich and isolate microvesicles that comprise a specific surface marker and that the contents of the isolated microvesicles, specifically RNA, within can be further analyzed.

The microvesicle isolation methods of the present disclosure were used to isolate microvesicles from plasma samples. Two parallel isolations were performed. One isolation, hereafter referred to as the control isolation, used magnetic beads comprising non-specific IgG. The second isolation used magnetic beads comprising anti-GYPA antibodies. The isolations were performed using a high-density matrix as described in Examples 1 and 2. Following isolation, the purified microvesicles were analyzed using quantitative PCR to analyze the expression level of four genes: HBB, GAPDH, Qbeta and RPL4.

Figure 6:
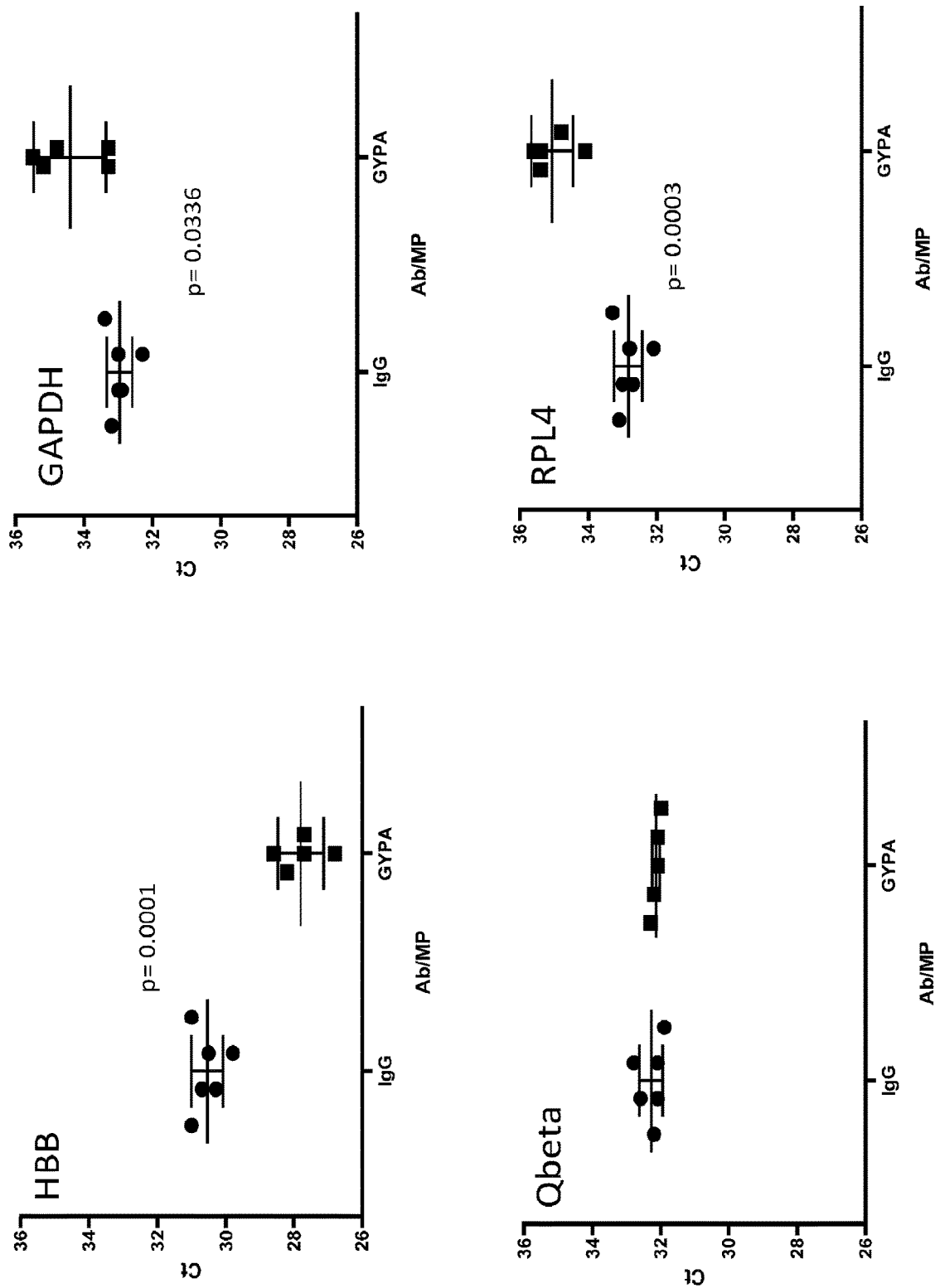
FIG. 6 is a chart showing the amount of microvesicular beta-globin RNA, expressed as a cycle threshold (Ct) value, recovered using the microvesicle isolation methods of the present disclosure in two-operator experiment.

The results of the quantitative PCR analysis are shown in FIG. 6 and Table 6. As shown in FIG. 6 and Table 6, isolation with the magnetic beads comprising anti-GYPA antibodies led to an enrichment in microvesicles comprising HBB transcripts, as indicated by the lower Ct values measured for HBB. These lower Ct values indicate that microvesicles comprising the surface maker GYPA were specifically isolated and enriched.

TABLE 6

|  | Mean Ct | |
| --- | --- | --- |
|  | IgG (control) | anti-GYPA |
| HBB | 30.5 | 27.8 |
| GAPDH | 33.0 | 34.4 |
| Qbeta | 32.3 | 32.1 |
| RPL4 | 32.8 | 35.0 |

Thus, the results of this example demonstrate that the microvesicle isolation methods of the present disclosure can specifically isolate and enrich microvesicles comprising a particular surface marker and RNA from these enriched microvesicles can be further analyzed.

Example 4

Without wishing to be bound by theory, the following example demonstrates that the microvesicle isolation methods of the present disclosure are reproducible and robust, including across different operators (i.e. researchers or technicians physically performing the isolation).

The microvesicle isolation methods of the present disclosure were used in a two-operator study to determine the reproducibility and robustness of the methods. Two operators (Operator #1 and Operator #2) each performed two sets of microvesicle isolations using the methods of the present disclosure. In the first set of isolations, hereafter referred to as the control isolations, the operators used magnetic beads comprising non-specific IgG. In the second set of isolations, the operators used magnetic beads comprising anti-GYPA antibodies. The isolations were performed using a high-density matrix as described in Examples 1 and 2.

Figure 7:
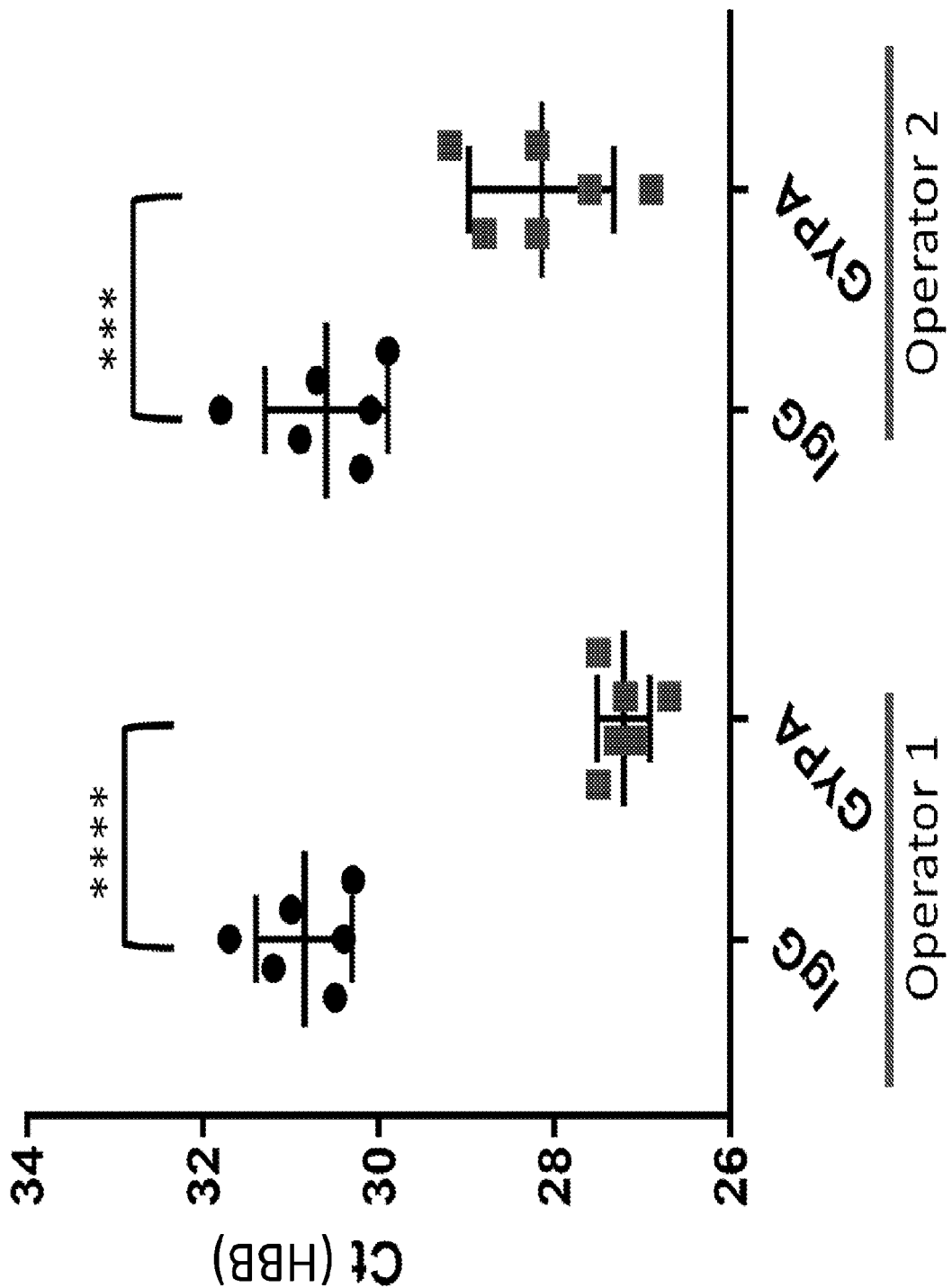
FIG. 7 is a chart showing the amount of microvesicular beta-globin RNA, expressed as a cycle threshold value, recovered using the microvesicle isolation methods of the present disclosure in three-operator experiment.

Following isolation, the purified microvesicles were analyzed using quantitative PCR. The results of the quantitative PCR analysis are shown in FIG. 7. As shown in FIG. 7, not only did isolation with the magnetic beads comprising GYPA-antibodies yield enrichment of microvesicles comprising HBB transcripts, but a similar level of enrichment was observed between the isolations of the two different operators.

Figure 11:
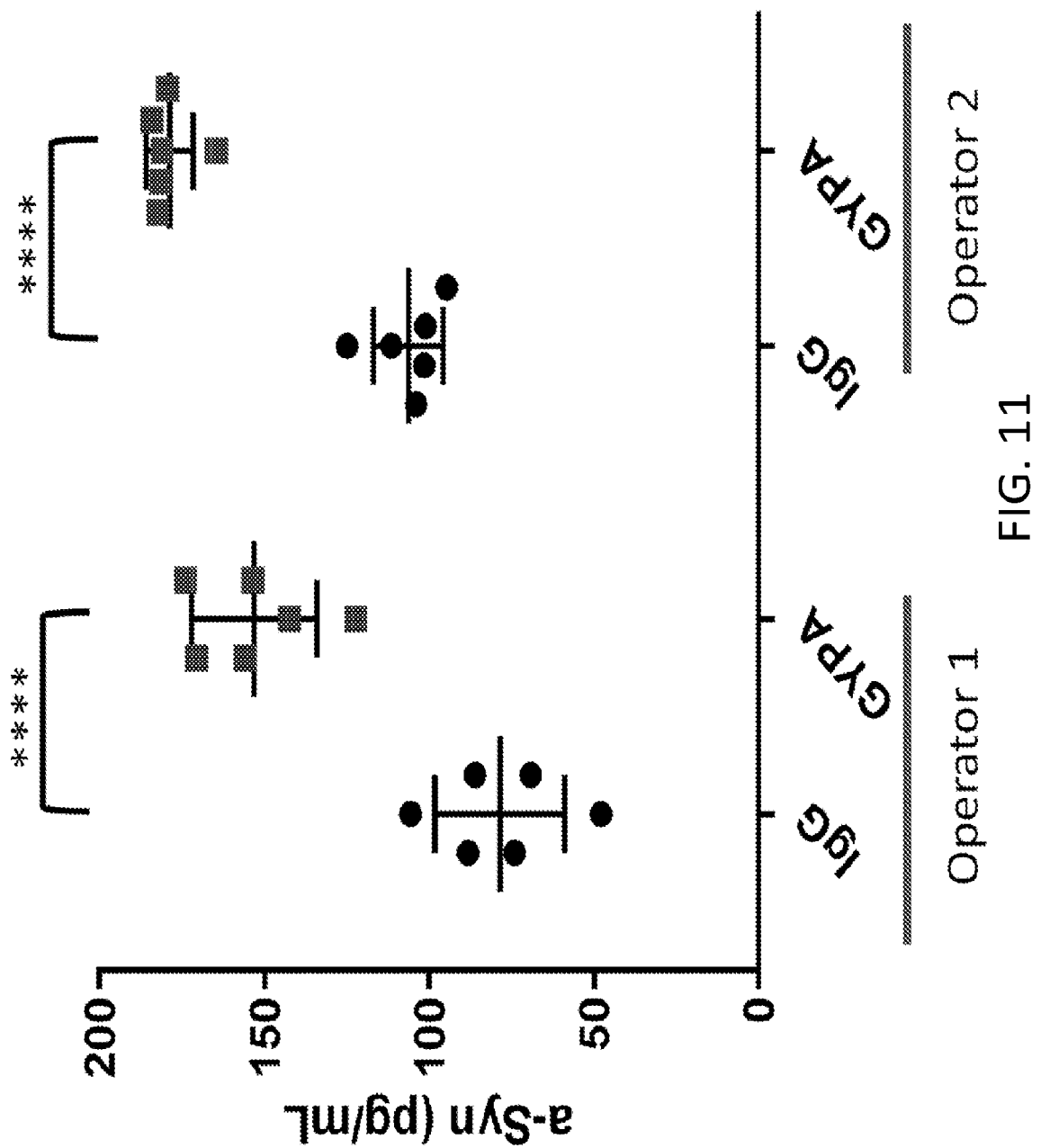
FIG. 11 is a chart showing the amount of microvesicular alpha-synuclein protein recovered using the microvesicle isolation methods of the present disclosure in a two-operator experiment.

Additionally, following isolation, the purified microvesicles were analyzed to determine the level of alpha synuclein (a-Syn) in the purified microvesicles. The results of this analysis are shown in FIG. 11. As shown in FIG. 11, not only did isolation with the magnetic beads comprising GYPA-antibodies lead to enrichment of microvesicles comprising a-Syn, but a similar level of enrichment was observed between the isolations of the two different operators.

Figure 8:
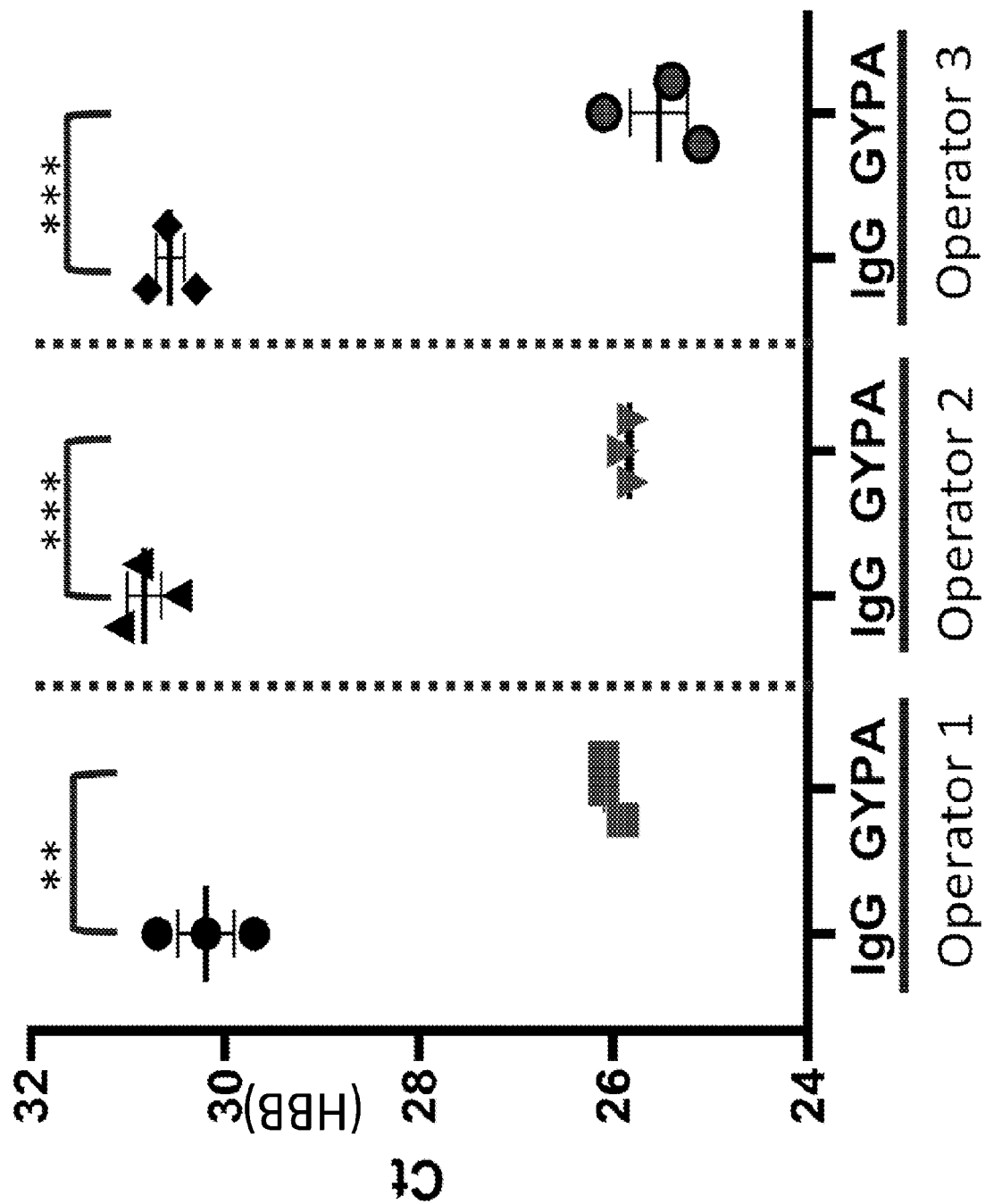
FIG. 8 is a chart showing the amount of microvesicular beta-globin RNA, GAPDH RNA, RPL4 RNA, and Qbeta RNA, expressed as a cycle threshold (Ct) value recovered using the microvesicle isolation methods of the present disclosure and existing immunoaffinity-based isolation methods.

The previous experiment was then repeated with three operators (Operator #1, Operator #2 and Operator #3). The results of the three-operator experiment are shown in FIG. 8. As shown in FIG. 8, not only did isolation with the magnetic beads comprising GYPA-antibodies lead to enrichment of microvesicles comprising HBB transcripts, but a similar level of enrichment was observed between the isolations of the three different operators.

Thus, the results described in this example demonstrate that the microvesicle isolation methods of the present disclosure are highly reproducible and robust, which is advantageous in a research or clinical setting that requires reproducibility between different operators.

Example 5

Without wishing to be bound by theory, the following example demonstrates that the microvesicle isolation methods of the present disclosure can be used to isolate and purify microvesicles from samples of different input volumes and can recover more microvesicles than existing immunoaffinity-based microvesicle isolation methods.

The microvesicle isolation methods of the present disclosure were used to isolate microvesicles from either 0.3 ml plasma samples or a 1.0 ml plasma samples. For each sample volume, two different sets of isolations were performed. One set of isolations, hereafter referred to as the control isolations, used magnetic beads comprising non-specific IgG. The second set of isolations used magnetic beads comprising anti-GYPA antibodies. The isolations were performed using a high-density matrix as described in Examples 1 and 2.

Figure 9:
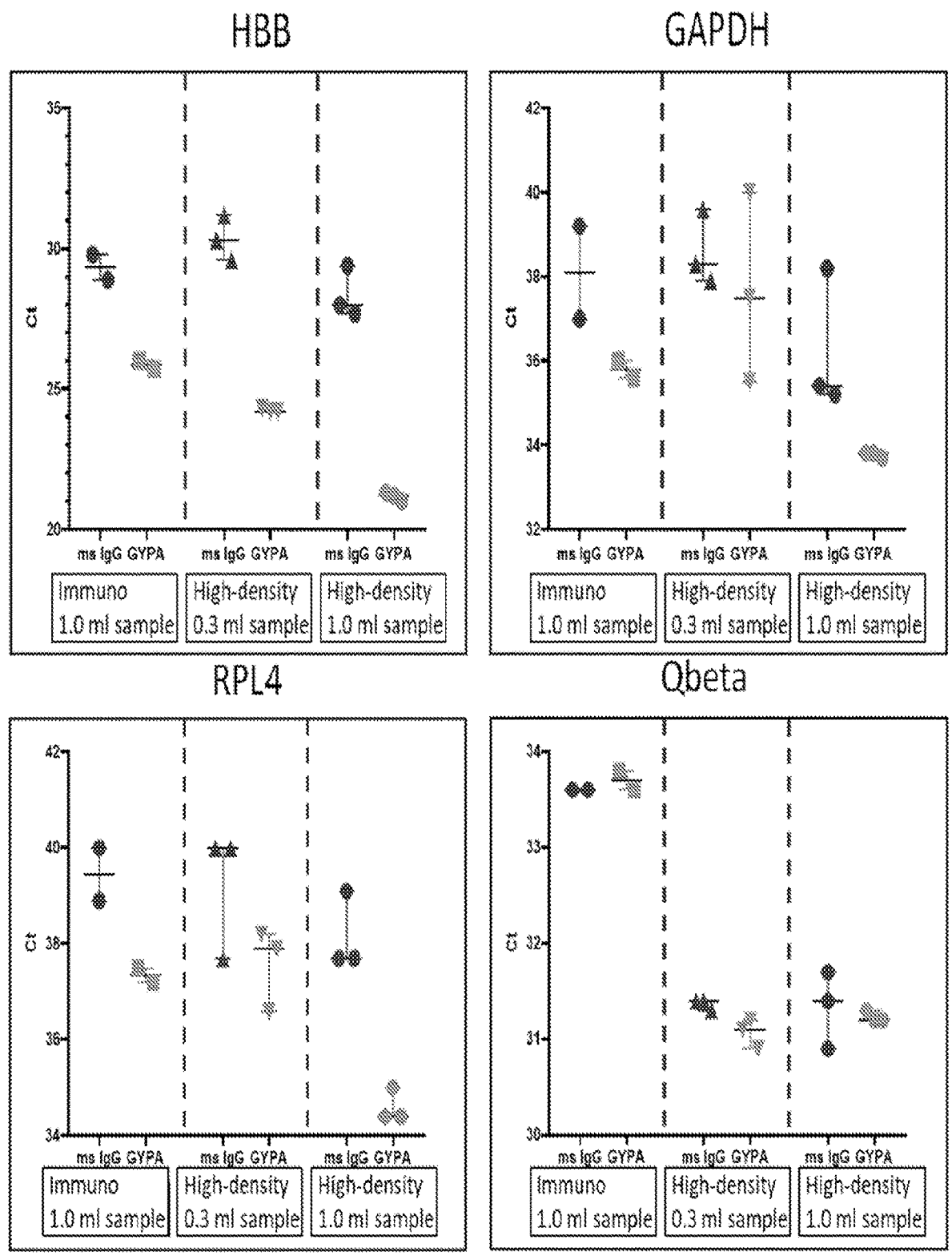
FIG. 9 is a chart showing the amount of microvesicular alpha-synuclein protein recovered using the microvesicle isolation methods of the present disclosure.

Following the isolations, the purified microvesicles were analyzed using quantitative PCR to analyze the expression level of four genes: HBB, GAPDH, Qbeta and RPL4. The results of the quantitative PCR analysis are shown in FIG. 9 and Table 7. In FIG. 9 and Table 7, the isolations performed using the methods of the present disclosure are labeled "High-density 0.3 ml Sample" and "High-density 1.0 ml sample". In Table 7, the term "dCt" is used to describe the average difference between the Ct values measured for each gene isolated using the magnetic beads comprising non-specific IgG and the Ct values measured for each gene isolated using the magnetic beads comprising the anti-GYPA antibodies. Thus, a negative dCt value for a particular gene indicates that the use of the magnetic beads comprising the anti-GYPA antibodies yielded an enrichment of microvesicles comprising transcripts of that gene. The greater the enrichment, the greater the absolute value of the dCT value.

The results shown in FIG. 9 and Table 7 demonstrate that the methods of the present disclosure can be used to specifically isolate and enrich microvesicles comprising a specific surface marker (in this case GYPA), and that this isolation and enrichment can be achieved using different input sample volumes.

To compare the microvesicle isolation methods of the present disclosure with existing immunoaffinity-based microvesicle isolation methods, an additional experiment was performed that used the existing immunoaffinity-based microvesicle isolation methods to isolate microvesicles from 1.0 ml plasma samples. The existing immunoaffinity-based microvesicle isolation methods do not use a high-density matrix and instead rely on repeated washing of the magnetic beads to purify the desired microvesicles. As above, two sets of isolations were performed. One set of isolations, hereafter referred to as the control isolations, used magnetic beads comprising non-specific IgG. The second set of isolations used magnetic beads comprising anti-GYPA antibodies. Following the isolations, the purified microvesicles were analyzed using quantitative PCR to analyze the expression level of four genes: HBB, GAPDH, Qbeta and RPL4. The results of the quantitative PCR analysis are shown in FIG. 9 and Table 7. In FIG. 9 and Table 7, the isolations performed using the existing immunoaffinity-based microvesicle isolation methods are labeled "Immuno 1.0 mL".

TABLE 7

| | HBB | | | GAPDH | | | RPL4 | | | Qbeta | | |
|---|---|---|---|---|---|---|---|---|---|---|---|---|
| | IgG (Ct) | GYPA (Ct) | dCt | IgG (Ct) | GYPA (Ct) | dCt | IgG (Ct) | GYPA (Ct) | dCt | IgG (Ct) | GYPA (Ct) | dCt |
| Immuno (1.0 ml) | 29.4 | 25.8 | −3.5 | 38.1 | 35.8 | −2.3 | 39.4 | 37.4 | −2.1 | 33.6 | 33.7 | 0.2 |
| High-density (0.3 ml) | 30.4 | 24.2 | −6.1 | 38.6 | 37.7 | −0.9 | 39.2 | 37.6 | −1.7 | 31.4 | 31.1 | −0.3 |
| High-density (1.0 ml) | 28.4 | 21.2 | −7.2 | 36.2 | 33.8 | −2.5 | 38.2 | 34.6 | −3.6 | 31.3 | 31.2 | −0.1 |

The results shown in FIG. 9 and Table 7 demonstrate that the microvesicle isolation methods of the present disclosure are superior to the existing immunoaffinity-based microvesicle isolation methods, in that the methods of the present disclosure can more effectively isolate and enrich microvesicles. Using the anti-GYPA magnetic beads, the methods of the present disclosure enriched significantly more microvesicles as compared to the existing immunoaffinity-based methods, as evidenced by the lower Ct values measured for HBB. In fact, the methods of the present disclosure were able to extract more HBB transcripts (and therefore more microvesicles) from a 0.3 ml plasma sample than the existing immunoaffinity-based methods could from a 1.0 ml plasma sample.

Thus, the results described in this example demonstrate that the microvesicle isolation methods of the present disclosure can not only isolate and enrich microvesicles from samples with different input volumes, but do so more efficiently than existing immunoaffinity-based isolation methods. The fact that the methods of the present disclosure can effectively use samples with smaller input volumes is advantageous for several reasons, including requiring clinicians to extract smaller samples from patients. Moreover, small input volumes are more amenable to large-scale automation.

Example 6

Without wishing to be bound by theory, the following example demonstrates that the methods of the present disclosure can be used to specifically enrich microvesicles that comprise a specific surface marker and protein within the enriched microvesicles can be analyzed.

The microvesicle isolation methods of the present disclosure were used to isolate microvesicles from plasma samples. Two parallel isolations were performed. One isolation, hereafter referred to as the control isolation, used magnetic beads comprising non-specific IgG. The second isolation used magnetic beads comprising anti-GYPA antibodies. The isolations were performed using a high-density matrix as described in Examples 1 and 2.

Figure 10:
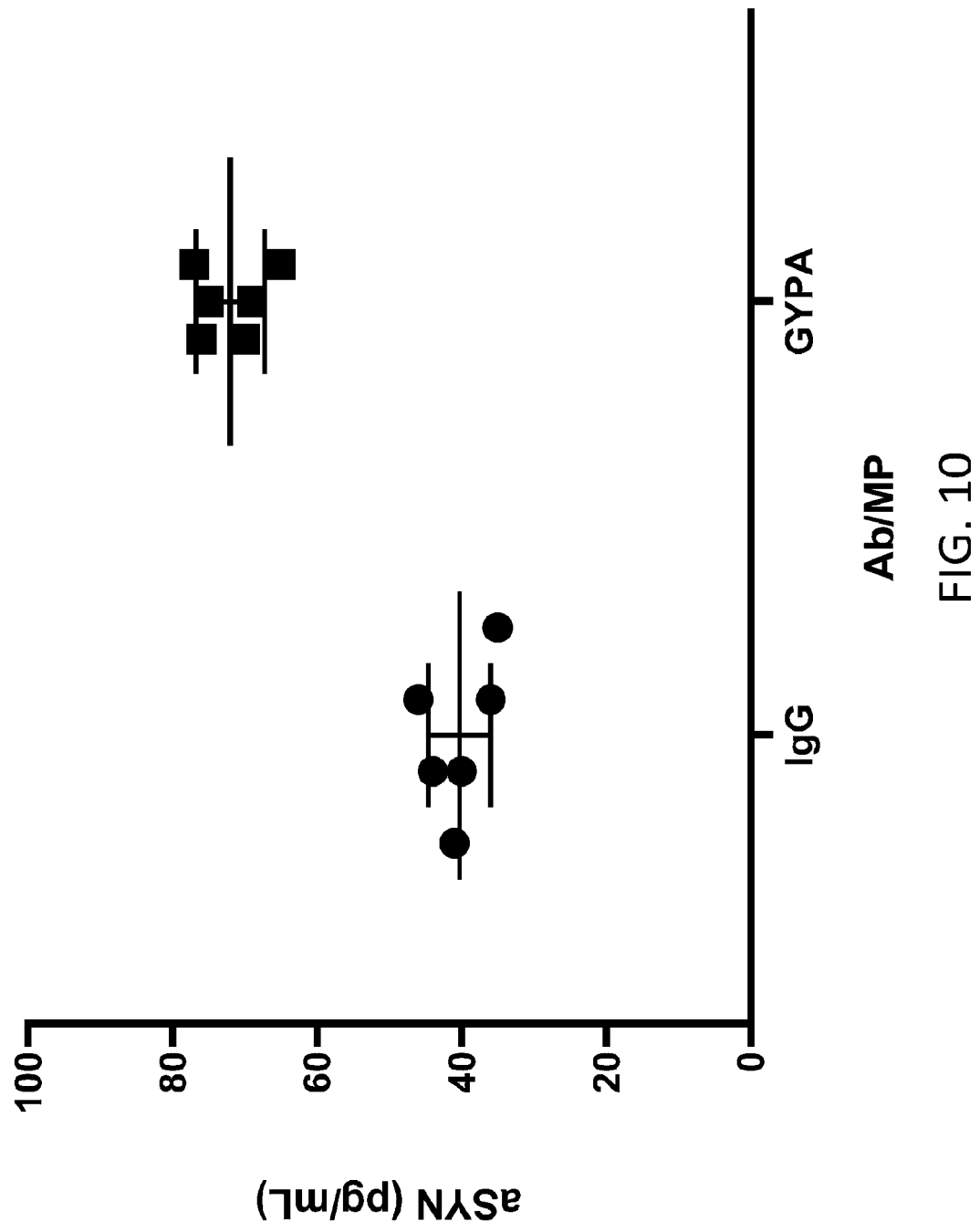
FIG. 10 is a chart showing the amount of microvesicular alpha-synuclein protein recovered using the microvesicle isolation methods of the present disclosure.

Following isolation, the amount of alpha-synuclein (a-SYN; SNCA) in the isolated microvesicles was analyzed. The results of this analysis are shown in FIG. 10. As shown in FIG. 10, isolation with the magnetic beads comprising anti-GYPA antibodies led to an enrichment in microvesicles comprising a-SYN as indicated by the increased amount of a-SYN measured in these microvesicles.

Thus, the results described in this example demonstrate that the microvesicle isolation methods of the present disclosure can specifically isolate and enrich microvesicles comprising a particular surface marker and the protein content of the isolated microvesicles can be further analyzed.

Example 7

Without wishing to be bound by theory, the following example demonstrates that the methods of the present disclosure can be used to enrich and isolate microvesicles that comprise specific surface markers.

The microvesicle isolation methods of the present disclosure were used to isolate microvesicles from 1 ml plasma samples. Three parallel isolations were performed. One isolation, hereafter referred to as the control isolation, used magnetic beads comprising non-specific IgG. The second isolation used magnetic beads comprising anti-GYPA antibodies. The third isolation used magnetic beads comprising anti-P-selectin (SELP) antibodies. The isolations were performed using a high-density matrix as described in Examples 1 and 2.

Figure 12:
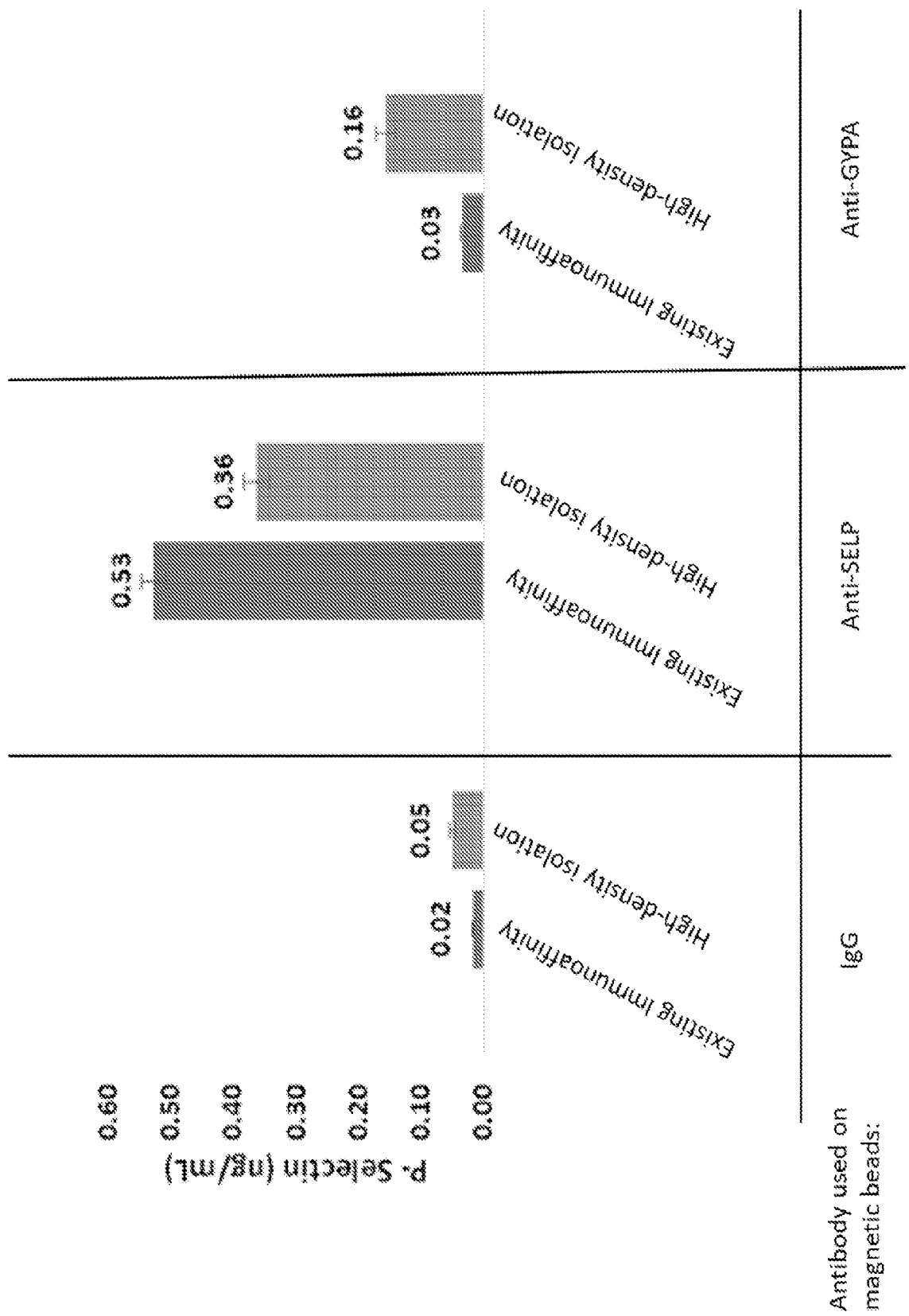
FIG. 12 is a chart showing the amount of microvesicular P-selectin protein recovered using the microvesicle isolation methods of the present disclosure and existing immunoaffinity-based isolation methods.
Figure 13:
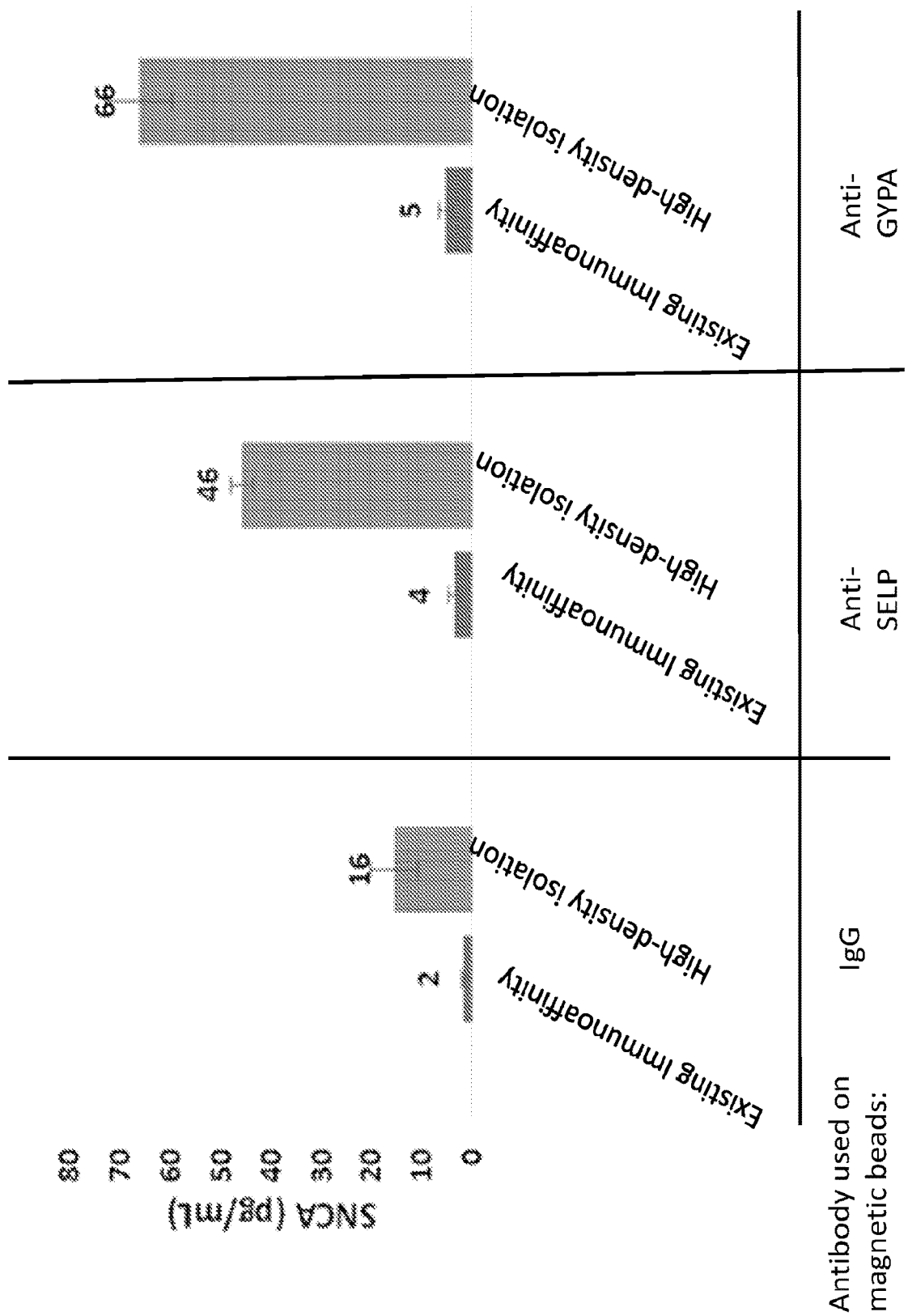
FIG. 13 is a chart showing the amount of microvesicular SNCA protein recovered using the microvesicle isolation methods of the present disclosure and existing immunoaffinity-based isolation methods.

Following isolation, the purified microvesicles were analyzed to determine the level of SELP protein and SNCA protein recovered. The results of this analysis are shown in FIG. 12 (SELP protein recovery) and FIG. 13 (SNCA protein recovery). In FIG. 12 and FIG. 13, the isolations performed using the methods of the present disclosure are labeled as "High-density isolation". As shown in FIG. 12 and FIG. 13, isolation with magnetic beads comprising anti-GYPA antibodies or magnetic beads comprising anti-SNCA resulted in the enrichment in microvesicles comprising SELP and SNCA, as indicated by the increased amount of P-selectin and SNCA measured in these isolated microvesicles.

To compare the microvesicle isolation methods of the present disclosure with existing immunoaffinity-based microvesicle isolation methods, an additional experiment was performed that used the existing immunoaffinity-based microvesicle isolation methods to isolate microvesicles from 1.0 ml plasma samples. The existing immunoaffinity-based microvesicle isolation methods do not use a high-density matrix and instead rely on repeated washing of the magnetic beads to purify the desired microvesicles. As above, three sets of isolations were performed. One isolation, hereafter referred to as the control isolation, used magnetic beads comprising non-specific IgG. The second isolation used magnetic beads comprising anti-GYPA antibodies. The third isolation used magnetic beads comprising anti-SELP antibodies. Following isolation, the purified microvesicles were analyzed to determine the level of P-selectin protein and SNCA protein recovered. The results of this analysis are shown in FIG. 12 (P-Selectin protein recovery) and FIG. 13 (SNCA protein recovery). In FIG. 12 and FIG. 13, the isolations performed using the existing immunoaffinity-based microvesicles are labeled as "Existing immunoaffinity". As shown in FIG. 12 and FIG. 13, the isolations performed using the methods of the present disclosure resulted in the recovery of more P-selectin protein and SNCA protein, indicating that the methods of the present disclosure are superior to the existing immunoaffinity-based microvesicle isolation methods in that the methods of the present disclosure can more effectively isolate and enrich microvesicles.

Thus, the results described in this example demonstrate that the microvesicle isolation methods of the present disclosure not only isolate and enrich microvesicles comprising particular surface markers, but also do so more efficiently than existing immunoaffinity-based isolation methods.

Example 8

Without wishing to be bound by theory, the following example demonstrates that the methods of the present disclosure can be used to enrich and isolate microvesicles that comprise specific surface markers. In this non-limiting example, the surface markers are proteins that are known to be located on the cellular surface of neurons.

The microvesicle isolation methods of the present disclosure were used to isolate microvesicles from a biological sample. Five parallel isolations were performed. One isolation, hereafter referred to as the control isolation, used magnetic beads comprising non-specific IgG. The second isolation used magnetic beads comprising anti-GYPA antibodies. The third isolation used magnetic beads comprising anti-ST8IA5 antibodies. The fourth isolation used magnetic beads comprising anti-myelin basic protein (MBP) antibodies. The fifth isolation used magnetic beads comprising anti-GluR2 antibodies. The isolations were performed using a high-density matrix as described in Examples 1 and 2.

Figure 14:
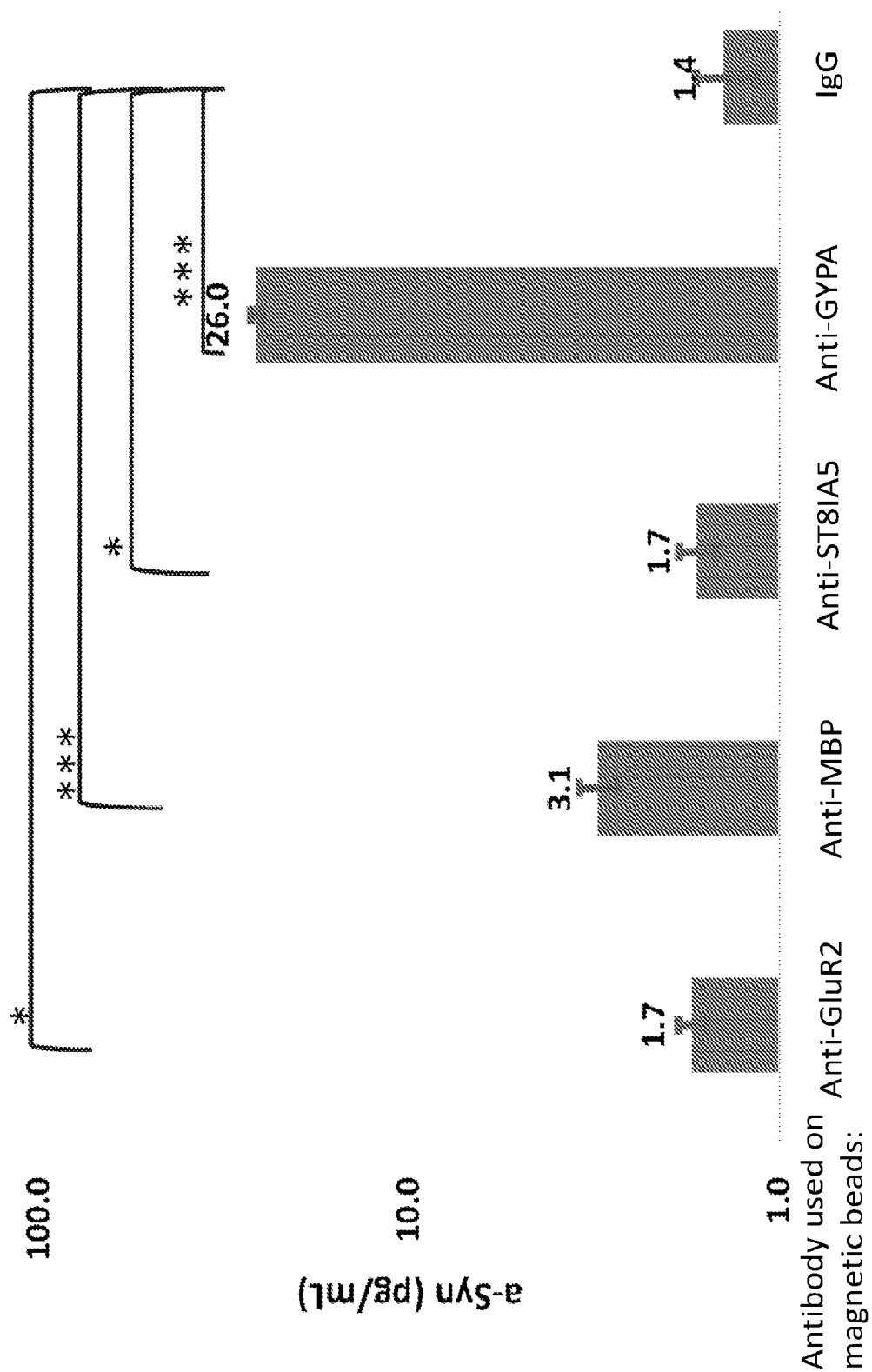
FIG. 14 is a chart showing the amount of microvesicular alpha-synuclein protein recovered using the microvesicle isolation methods of the present disclosure.

Following isolation, the amount of alpha-synuclein (a-SYN) in the isolated microvesicles was analyzed. The results of this analysis are shown in FIG. 14. As shown in FIG. 14, more a-Syn protein was recovered when the magnetics beads comprising either anti-GYPA antibodies, anti-ST8IA5 antibodies, anti-MBP antibodies or anti-GluR2 antibodies was used as opposed to when the magnetic beads comprising IgG were used. The increased amounts of recovered a-Syn indicate the enrichment and isolation of microvesicles comprising the specific surface markers GYPA, MBP, GluR2 and ST8IA5. Without wishing to be bound by theory, in the case of MBP, GluR2 and ST8IA5, these microvesicles are likely neuronal derived microvesicles as they comprise these neuronal surface proteins.

Accordingly, the results of this experiment demonstrate that the microvesicle isolation methods of the present disclosure can enrich and isolate microvesicles comprising specific surface markers, particularly microvesicles that are derived from certain cell types.

What is claimed is:

1. A method of isolating at least one microvesicle comprising at least one surface marker from at least one biological sample, the method comprising:
    a) incubating the at least one biological sample with at least one particle that binds to the at least one surface marker under conditions sufficient to form at least one magnetic particle-microvesicle complex, wherein the at least one particle is a magnetic particle;
    b) contacting the at least one biological sample comprising the at least one magnetic particle-microvesicle complex with at least one high-density matrix, wherein the at least one high-density matrix has a density that is equal to or greater than 1.22 g/ml; and
    c) subjecting the at least one biological sample comprising the at least one magnetic particle-microvesicle complex and the at least one high-density matrix to a magnetic field such that the at least one magnetic particle-microvesicle complex is translocated through the high-density matrix, thereby isolating at least one microvesicle.

2. A method of isolating at least one microvesicle comprising at least one surface marker from at least one biological sample, the method comprising:
    a) incubating the at least one biological sample with at least one particle that binds to the at least one surface marker under conditions sufficient to form at least one particle-microvesicle complex;
    b) contacting the at least one biological sample comprising the at least one particle-microvesicle complex with at least one high-density matrix, wherein the at least one high density-matrix has a density that is equal to or greater than 1.22 g/ml; and
    c) subjecting the at least one biological sample comprising the at least one particle-microvesicle complex and the at least one high-density matrix to at least one force such that the at least one particle-microvesicle complex is translocated through the high-density matrix, thereby isolating at least one microvesicle.

3. The method of claim 2, wherein the force is a magnetic force, gravitational force, centrifugal force, pressure or any combination thereof.

4. The method of claim 1, wherein the at least one high-density matrix comprises Optiprep, sucrose, Ficoll, Histopaque, Percoll, or any combination thereof.

5. The method of claim 1, wherein the at least one particle comprises at least one antibody or at least one antibody fragment that binds to the at least one surface marker.

6. The method of claim 5, wherein the at least one antibody or at least one antibody fragment is coupled to the at least one particle by perfectly base-paired sense and anti-sense oligonucleotides, a partially double-stranded oligonucleotide, a double-stranded oligonucleotide, a photocleavable linker moiety, a disulfide bond, at least one peptide, or any combination thereof.

7. The method of claim 1, wherein the particle comprises at least one affinity molecule that binds to the at least one surface marker.

8. The method of claim 7, wherein the at least one affinity molecule comprises at least one antibody fragment, at least one aptamer, at least one aptamer analog, at least one lectin, at least one molecularly imprinted polymer, or any combination thereof.

9. The method of claim 1, wherein the at least one particle comprises a ferromagnetic bead.

10. The method of claim 1, wherein steps (b) and (c) are performed in at least one well of a microwell plate.

11. The method of claim 10, wherein the microwell plate is a 6-well plate, a 12-well plate, a 48-well plate, a 96-well plate, a 384-well plate, or a 1536-well plate.

12. The method of claim 1, further comprising:
    d) removing the biological sample and the high-density matrix from the at least one particle-microvesicle complex.

13. The method of claim 1, further comprising:
    d) removing at least 80% of the biological sample and at least 80% of the high-density matrix from the at least one particle-microvesicle complex.

14. The method of claim 1, wherein removing the biological sample and the high-density matrix from the at least one particle-microvesicle complex comprises aspiration.

15. The method of claim 1, wherein the method results in isolation of at least 80% of microvesicles in the biological sample that comprise the at least one surface marker.

16. The method of claim 1, wherein the biological sample comprises blood, serum, plasma, urine cerebrospinal fluid or any combination thereof.

17. The method of claim 1, further comprising extracting at least one nucleic acid, at least one carbohydrate molecule, at least one lipid, at least one protein, or any combination thereof from the isolated at least one microvesicle.

* * * * *